United States Patent
Cooper et al.

(10) Patent No.: US 8,362,409 B2
(45) Date of Patent: Jan. 29, 2013

(54) SYSTEM AND METHOD FOR CONTINUOUS, ASYNCHRONOUS AUTOFOCUS OF OPTICAL INSTRUMENTS

(75) Inventors: Jeremy R. Cooper, Issaquah, WA (US); Paul Goodwin, Shore Line, WA (US)

(73) Assignee: Applied Precision, Inc., Issaquah, WA (US)

( * ) Notice: Subject to any disclaimer, the term of this patent is extended or adjusted under 35 U.S.C. 154(b) by 462 days.

(21) Appl. No.: 12/765,756

(22) Filed: Apr. 22, 2010

(65) Prior Publication Data

US 2011/0101203 A1 May 5, 2011

Related U.S. Application Data

(60) Provisional application No. 61/256,242, filed on Oct. 29, 2009, provisional application No. 61/267,353, filed on Dec. 7, 2009.

(51) Int. Cl.
  *G02B 7/04* (2006.01)
  *G03B 13/00* (2006.01)
  *G03B 21/53* (2006.01)

(52) U.S. Cl. ................... 250/201.4; 396/137

(58) Field of Classification Search ............... 318/626; 396/137; 359/825, 383, 237; 250/201.4
See application file for complete search history.

(56) References Cited

U.S. PATENT DOCUMENTS

| | | | |
|---|---|---|---|
| 4,011,446 A * | 3/1977 | Swanberg | 250/201.4 |
| 4,745,271 A * | 5/1988 | Benedetti et al. | 250/201.2 |
| 5,252,903 A | 10/1993 | Maruyama | |
| 6,094,538 A | 7/2000 | Asayama et al. | |
| 6,681,994 B1 | 1/2004 | Koenck | |
| 2009/0212030 A1 | 8/2009 | Clifford, Jr. | |

\* cited by examiner

*Primary Examiner* — Thanh Luu
*Assistant Examiner* — Renee Naphas

(57) ABSTRACT

Embodiments of the present invention are directed to autofocus subsystems within optical instruments that continuously monitor the focus of the optical instruments and adjust distances within the optical instrument along the optical axis in order to maintain a precise and stable optical-instrument focus at a particular point or surface on, within, or near a sample. Certain embodiments of the present invention operate asynchronously with respect to operation of other components and subsystems of the optical instrument in which they are embedded.

42 Claims, 27 Drawing Sheets

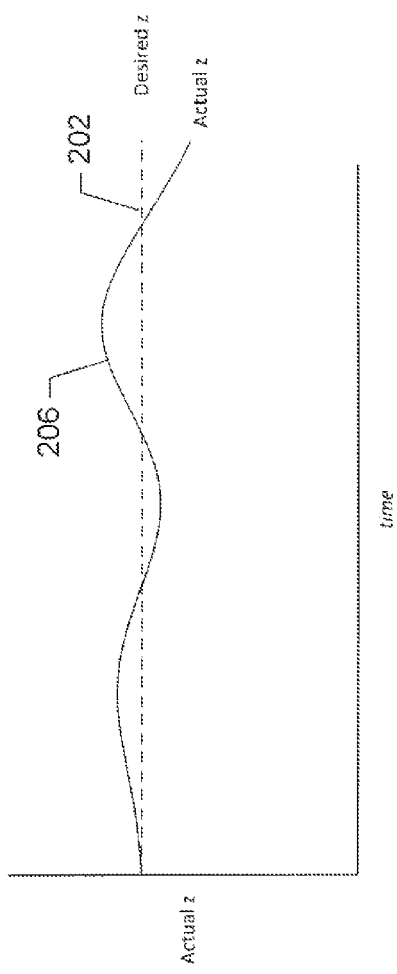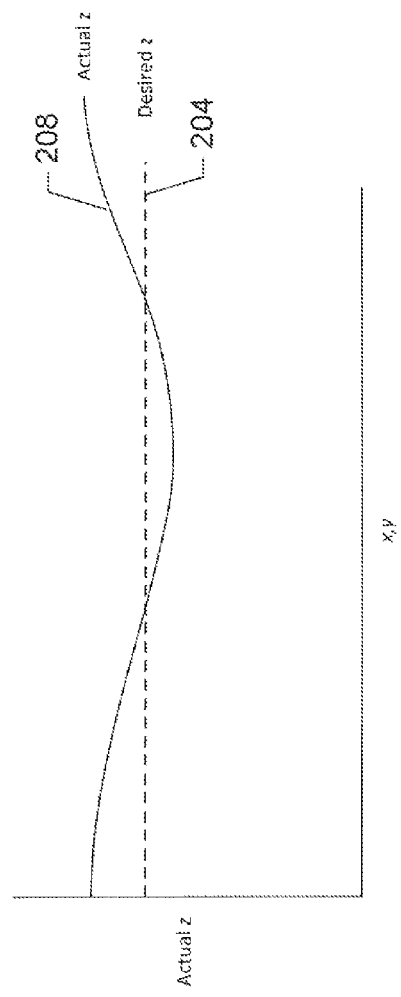

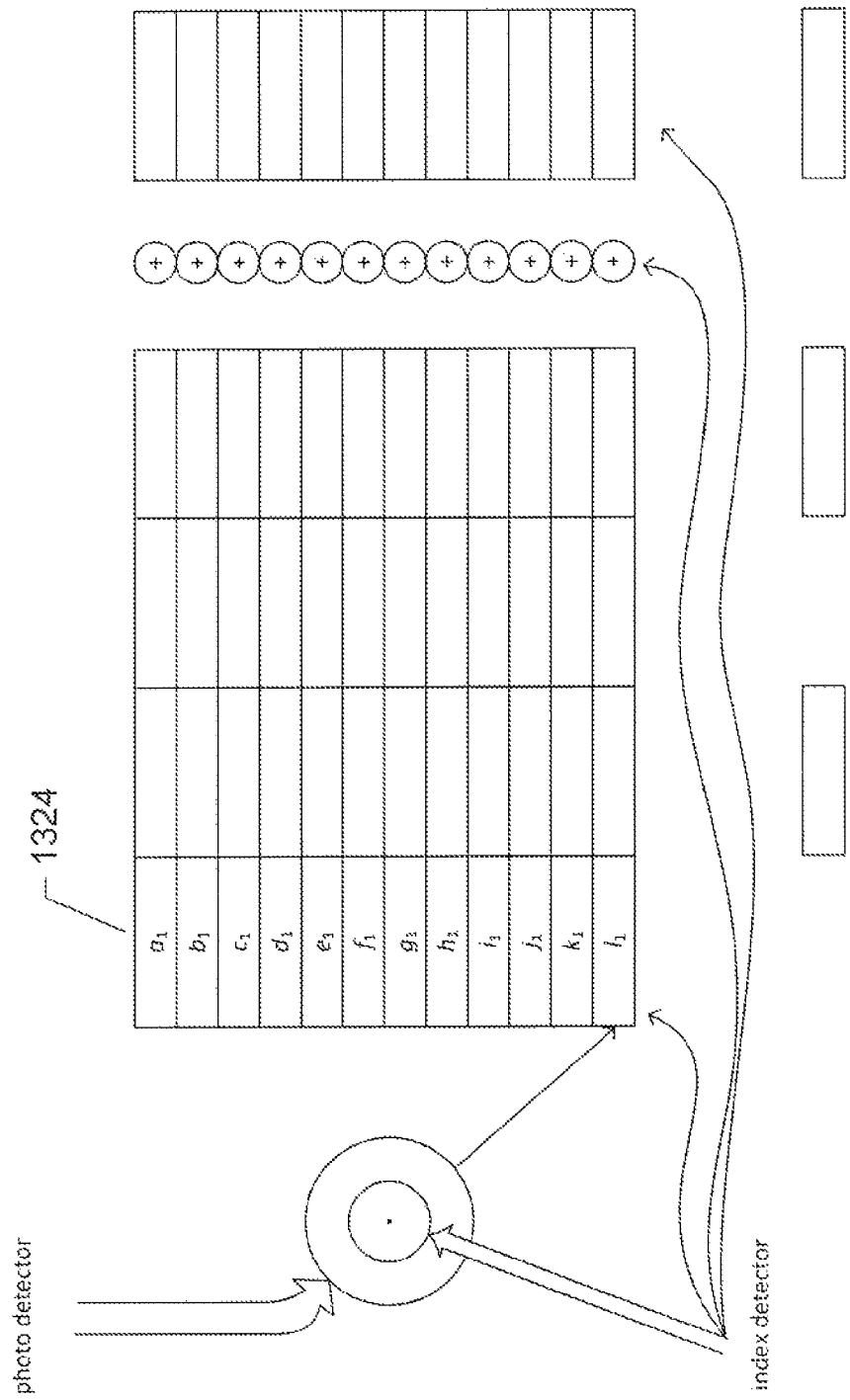

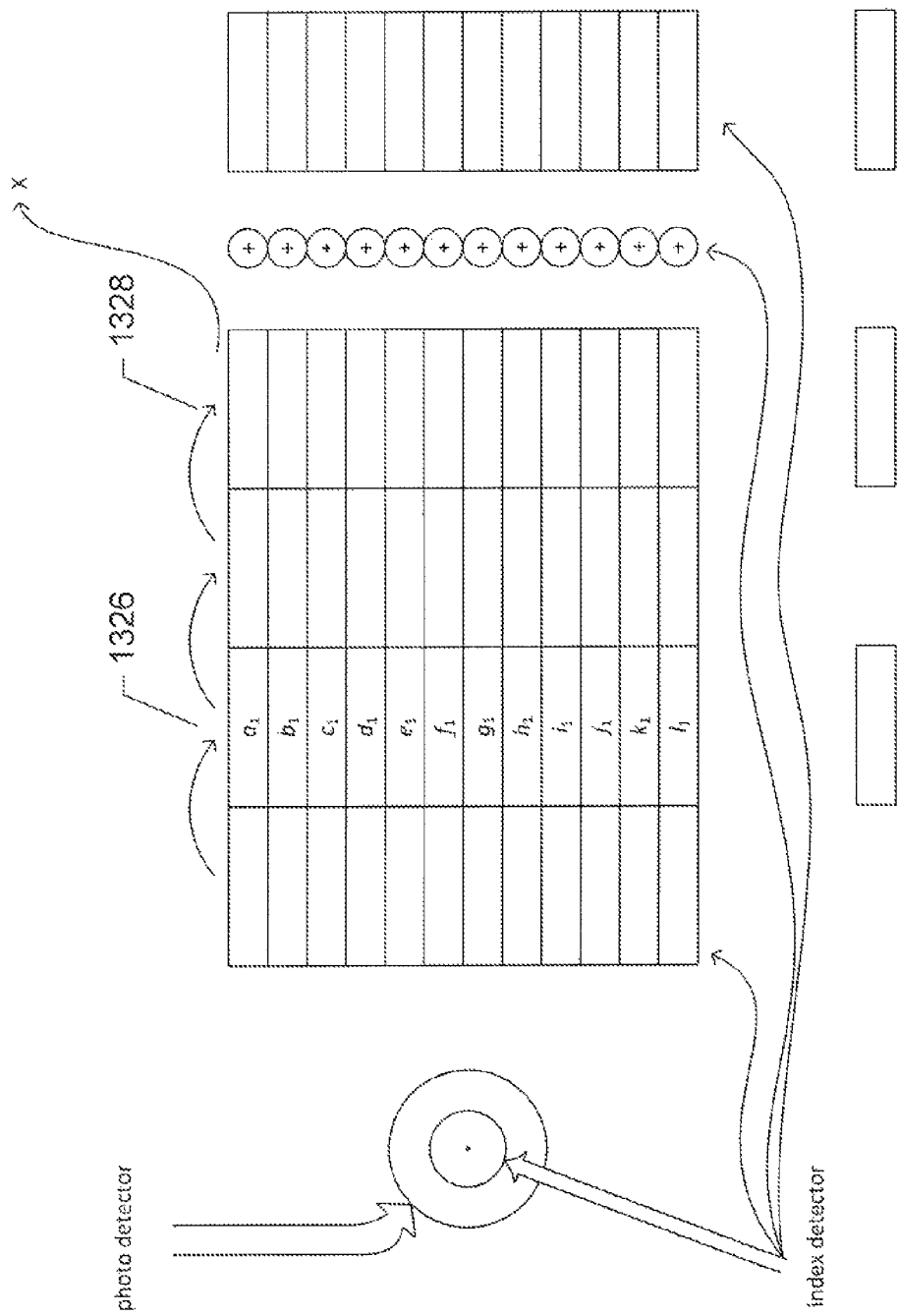

SYSTEM AND METHOD FOR CONTINUOUS, ASYNCHRONOUS AUTOFOCUS OF OPTICAL INSTRUMENTS

CROSS-REFERENCE TO RELATED APPLICATIONS

This application claims the benefit of Provisional Application No. 61/256,242, filed Oct. 29, 2009 and Provisional Application No. 61/267,353, filed Dec. 7, 2009.

TECHNICAL FIELD

The present invention is related to optical instruments and, in particular, to a continuous, asynchronously operating autofocus subsystem within an optical instrument that maintains a constant distance along the optical axis between an objective lens and a point or surface on, within, or near an imaged object.

BACKGROUND

While optical microscopy and other optics-based methods have been exploited in many domains of human activity, from scientific research to warfare for many hundreds of years, the advent of microprocessors, modern computing, and molecular biology have given rise to an ever-accelerating development of new optical instrumentation and optical-imaging technologies. For example, fluorescent tagging of proteins within living cells, combined with computational facilities incorporated in modern fluorescence-microscopy instrumentation allows fine detail of biological components of living cells to be imaged at resolutions significantly lower than the so-called "diffraction limit" for optical microscopy.

Many new optical instruments, applications of optical instruments, and optical-imaging technologies depend on precise focusing of high-powered optical systems with shallow depths of focus over prolonged periods of time and/or during scanning of imaged objects within the x-y plane orthogonal to the optical z axis. Examples include various optical-microscopy techniques that achieve below-diffraction-limit resolution by imaging weakly emitting fluorophores in biological samples over relatively long periods of time and optical-microscopy techniques for scanning living cells and other biological samples to image planes within these samples by translating the samples in the x-y plane with respect to the optical path of the microscope while maintaining a constant z position. The focus of optical instruments may vary, over time, as a result of thermal and electromechanical instabilities, for example, and even very precise electromechanical microscope stages may fluctuate, in distance with respect to imaging optics, as the stage is translated in the x-y plane while scanning samples or while collecting data from samples over periods of time. Designers, manufacturers, and users of precision optical instrumentation continue to seek systems and methods that stabilize the focus of high-precision optical instruments over time and while the various subcomponents of the high-precision optical instruments, including electromechanical stages, are operating.

SUMMARY

Embodiments of the present invention are directed to autofocus subsystems within optical instruments that continuously monitor the focus of the optical instruments and adjust distances within the optical instrument along the optical axis in order to maintain a precise and stable optical-instrument focus at a particular point or surface on, within, or near a sample. Certain embodiments of the present invention operate asynchronously with respect to operation of other components and subsystems of the optical instrument in which they are embedded.

BRIEF DESCRIPTION OF THE DRAWINGS

FIGS. 2A-B show the undesirable variation in the position of the focal point of the objective lens with respect to the optical axis, or z position, within a sample, over time, in the case of FIG. 2A, or during x and/or y translation of the sample, in the case of FIG. 2B.

FIGS. 13A-I illustrate one approach to computing the current distance between the objective lens and cover-slip interface of a microscope by the autofocus-processing subcomponent of an autofocus module that represents one embodiment attic present invention.

DETAILED DESCRIPTION

Figure 1A:
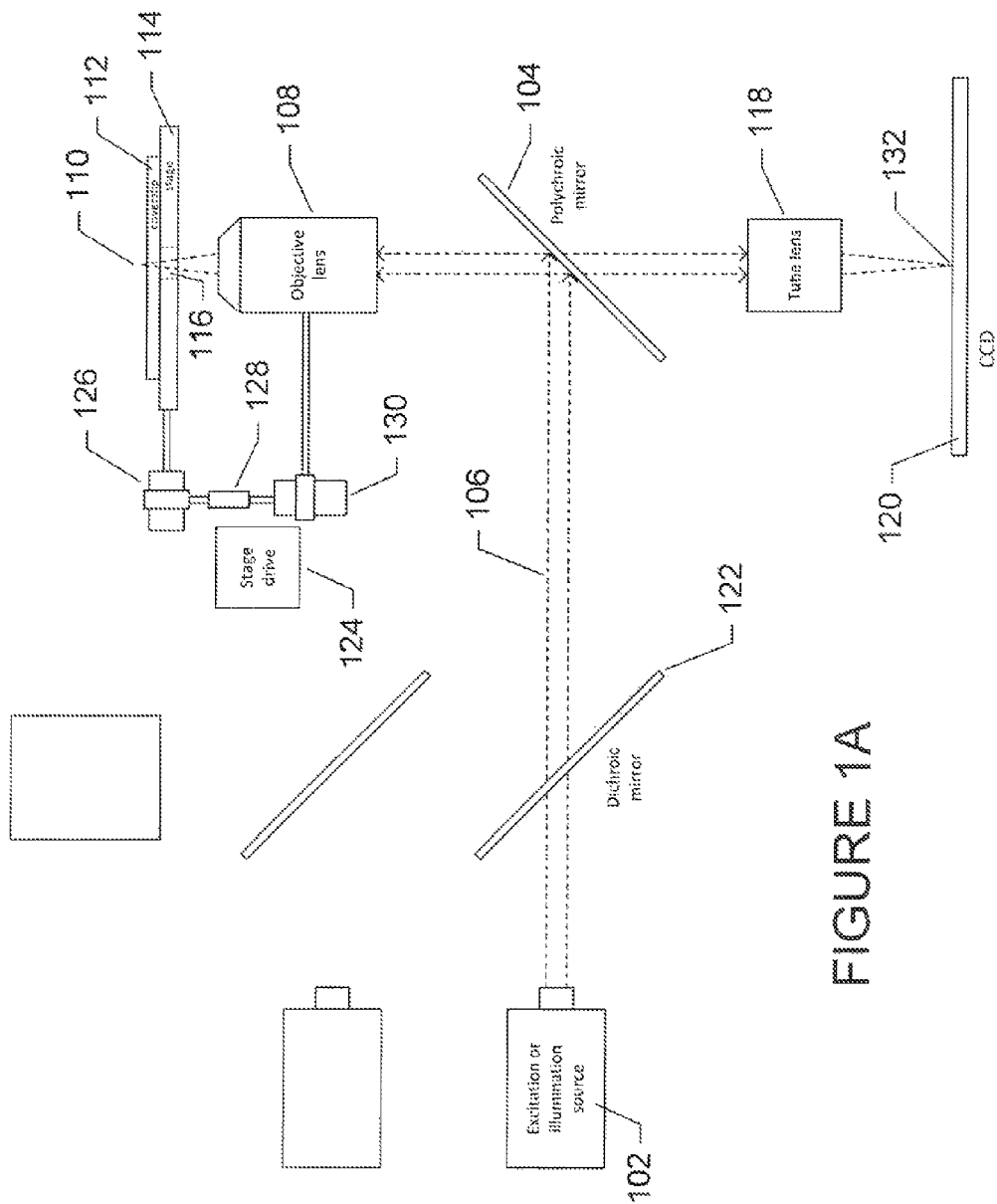
FIGS. 1A-C illustrate the optical path within a fluorescence microscope.
Figure 1B:
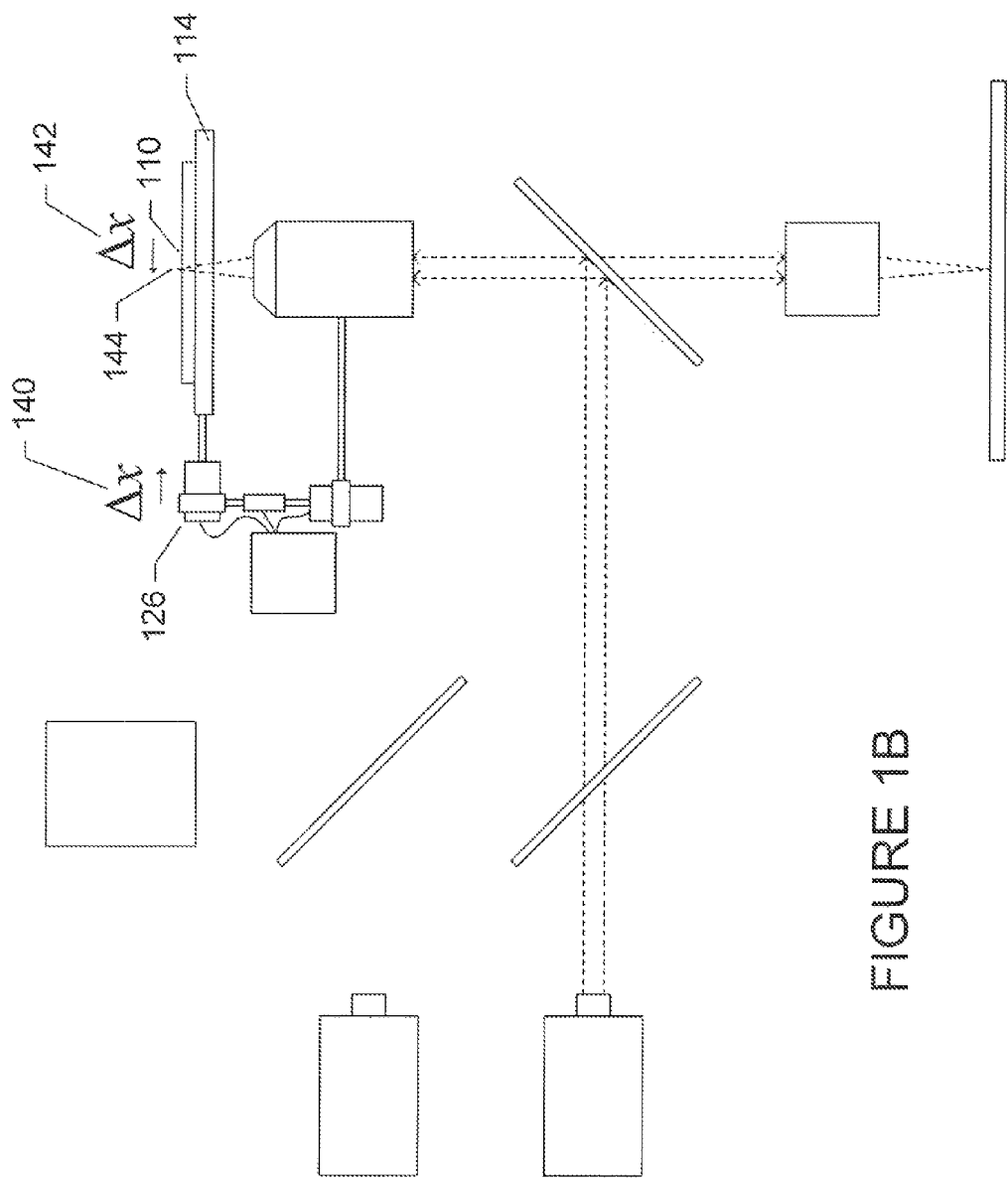
Figure 1C:
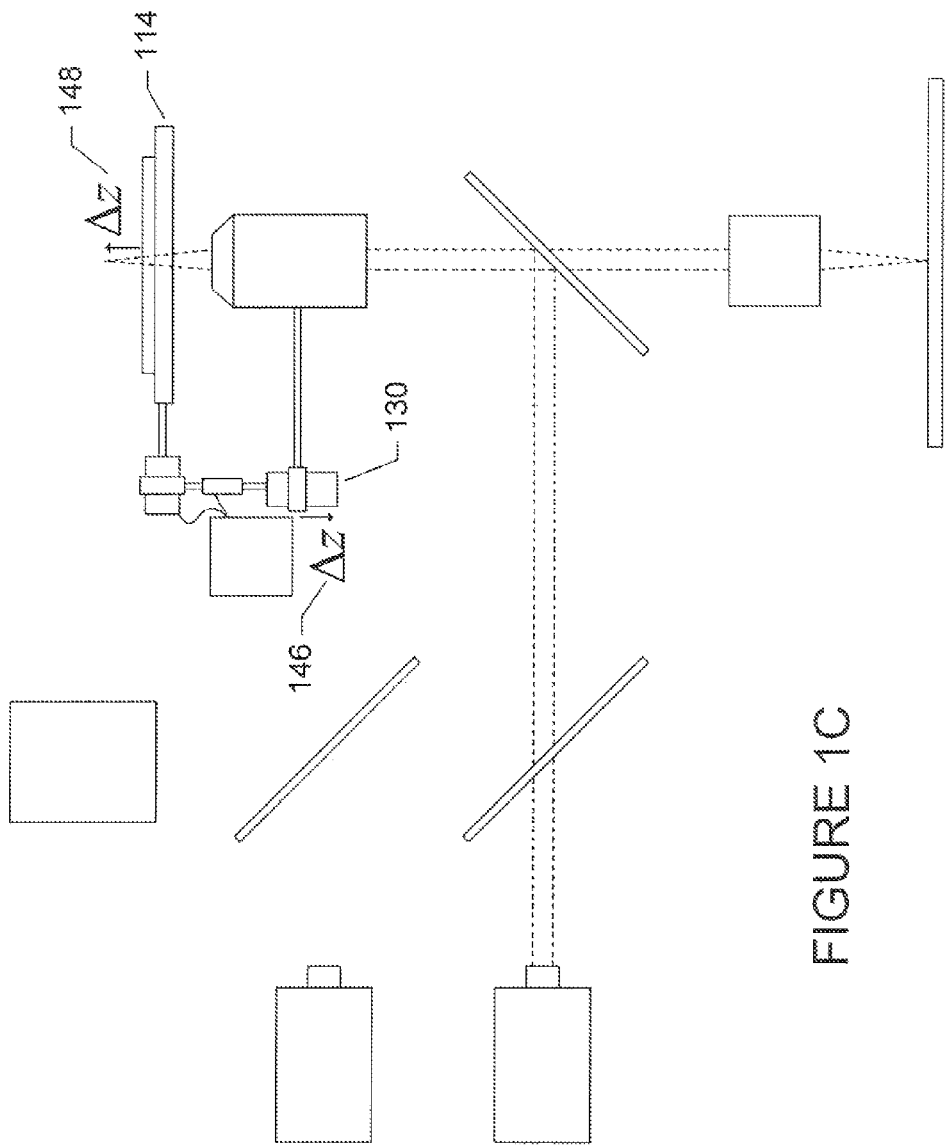

FIGS. 1A-C illustrate the optical path within a fluorescence microscope. The optical path, and the fluorescence microscope that contains the optical path, serve as a context for describing one embodiment of the present invention. However, as also noted below, the methods and systems of the present invention may be incorporated within a wide variety of different types of optical instruments, in many cases by adjusting various parameters and configurations of the embodiments of the present invention for use in particular applications.

The optical path of the fluorescence microscope includes an excitation-light source 102, generally a visible-light or UV-light laser, a polychroic mirror 104 that reflects the excitation light 106 into the objective lens or lenses 108, which focus the excitation light onto a point 110 within a sample resting on the far side eta cover slip 112 that lays on a mechanical-stage platform 114 with an aperture 116 through which the excitation light passes. The excitation light stimulates fluorescent emission from fluorophores within the sample. The emitted light from the fluorophores, generally with a longer wavelength than that of the excitation light, passes back through the objective lens or lenses 108 and through the polychroic mirror 104 to one or more tube lenses 118 that focus the light emitted by the fluorophores onto a photodetector 120, often a charge-coupled-device ("CCD") detector. Spatial intensities measured by the photodetector are electronically processed by computing subsystems to generate images of the imaged object which are stored in electronic memories and mass-storage devices and rendered for display on electronic display devices.

The polychroic mirror 104 reflects light of shorter wavelength, including the excitation light, and may also reflect light of very lone wavelength, such as infrared light, but is transparent to visible light within a range of wavelengths that includes the wavelengths of light emitted by fluorophores within fluorophore-labeled samples. Similarly, a dichroic mirror 122 on the initial path of the excitation light 106 is transparent to the relatively short-wavelength excitation light, but reflects longer-wavelength infrared light, as discussed in greater detail below. The electromechanical stage that includes the stage platform 114, a stage-drive component 124 and x 126, y 128, and z 130 translation mechanisms is used to move the sample, in x, y, and directions, with respect to the objective lens and instrument optical path. Note that the optical, or z, axis is parallel with the light path that extends vertically, in FIG. 1A, from the sample point 110 through the objective lens, polychroic mirror, and tube lens to a corresponding image point 132 on the detector 120.

In FIG. 1B, the x translation mechanism 126 has been activated to move the stage platform 114 rightward by a small distance +$\Delta$x 140, which results in an equal magnitude, but opposite shift −$\Delta$x 142 of the focal point within the sample in the x direction. The previous focal point 110 and new focal point 144 are, in other words, separated by a distance of magnitude |$\Delta$x| 142 following translation of the stage platform by a distance +$\Delta$x in the x direction. FIG. 1C shows, in a fashion similar to FIG. 1B, activation of the z translation apparatus 130 to move the mechanical stage 114 by small distance −$\Delta$z 146 in the z, or optical-axis, direction, resulting in a translation of the focal point within the sample by a distance +$\Delta$z of equal magnitude 148, but opposite direction. In this discussion, it is assumed that the distance between the detector 120 and tube lens 118, shown in FIG. 1A, is fixed, at least over a period of time during image acquisition from a sample, therefore fixing the focal point of the objective lens.

In many fluorescence-microscopy applications, including live-cell imaging, acquisition of high-resolution images depends on imaging a particular sample in a fixed position with respect to the objective lens for a period of time sufficient to collect adequate information from weakly emitting fluorophores for reconstructing images of the fluorophore labels within the sample. In other applications, a sample is scanned, by moving the electromechanical stage in the x-y plane relative to the objective lens, while maintaining a constant focus, or constant distance between the objective lens and the sample in the z, or optical-axis, direction. In both cases, the distance between the objective lens and a point or surface within the sample needs to be maintained at a precise-fixed value over a period of time and/or while the mechanical stage is translated in the x and y directions.

FIGS. 2A-B show the undesirable variation in the position of the focal point of the objective lens with respect to the optical axis, or z position, within a sample, over time, in the case of FIG. 2A, or during x and/or y translation of the sample, in the case of FIG. 2B. In both figures, a desired distance between the objective lens and sample is indicated by a dashed line 202 and 204. The actual distance between the objective lens and the sample is shown, in both figures, as a solid curve 206 and 208. Despite best efforts to maintain a fixed distance between the objective lens and a point or surface within the sample, the actual distance between the objective lens and sample, in the z, or optical-axis, direction varies over time and during x and/or y translation. These variations have many different causes. Thermal instability in the microscope environment can result in expansion or contraction of the optical instrument in directions with z-axis components, for example. Optical instruments are often surrounded by temperature-control chambers, but components of the optical instrument may generate and dissipate heat, including light sources, motors, and other such components, which cannot be immediately compensated for. Fluctuations in air pressure and other environmental parameters may also result in variations in the distance between the objective lens and sample. When the x-y plane of the electromechanical stage is oriented even slightly non-orthogonally to the optical axis, during scanning by translation in the x-y plane, the sample also moves in the z direction relative to the objective lens.

Figure 3:
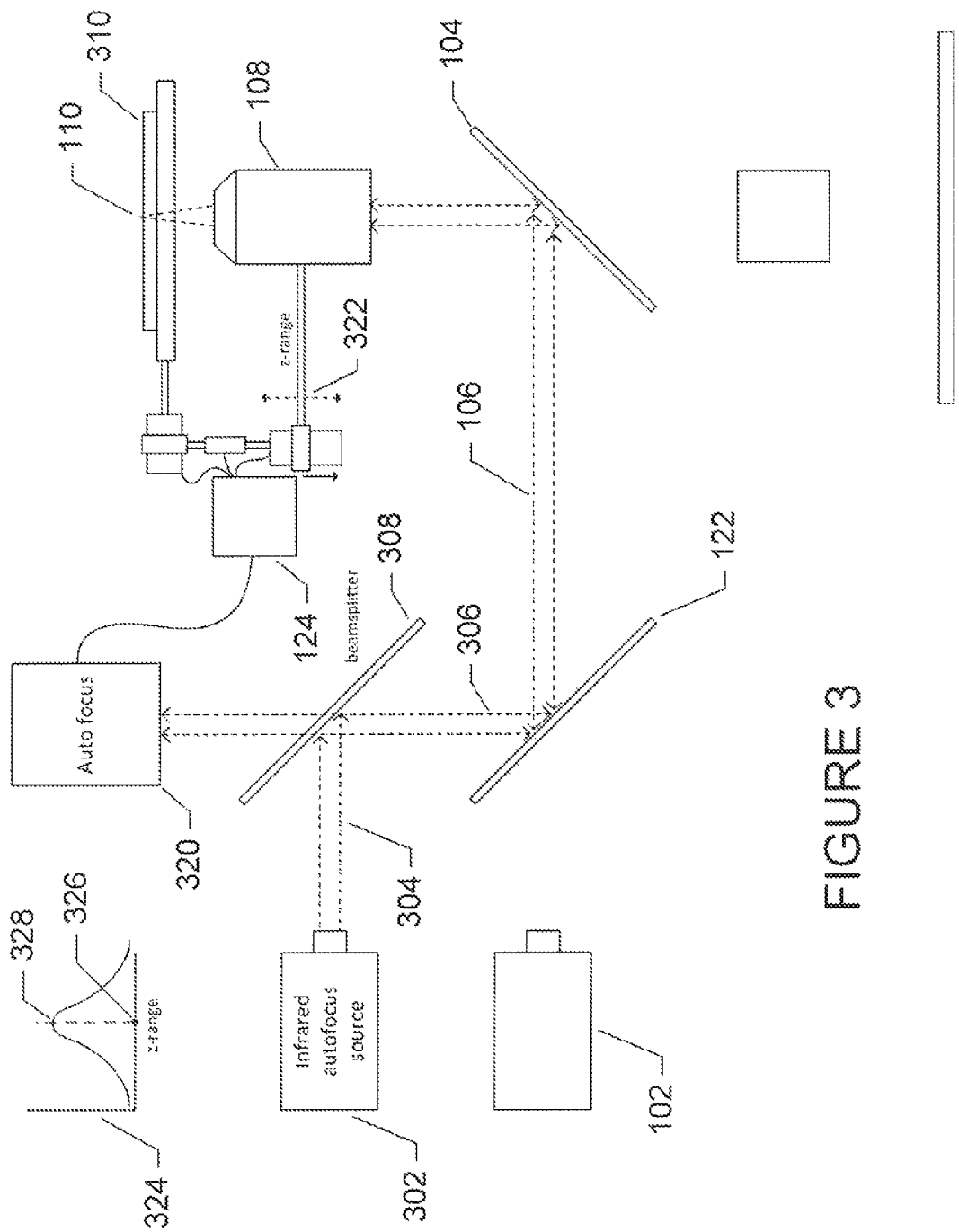
FIG. 3 illustrates a traditional autofocus subsystem of a microscope.

FIG. 3 illustrates a traditional autofocus subsystem of a microscope. Autofocus subsystems have been developed to stabilize focal-point location with respect to the optical axis within a sample over time and while the sample is moved in the x-y plane. FIG. 3 uses the same illustration conventions as used in FIGS. 1A-C. The autofocus subsystem shown in FIG. 3 uses a different autofocus-light source 302 than the excitation light source 102. In many systems, the autofocus-light source emits infrared light 304, a portion of which is reflected downward 306 by a beamsplitter 308 to the dichroic mirror 122, which reflects the infrared light in a horizontal direction 106 in FIG. 3, along the same optical path as that taken by light emitted by the excitation source 102, from which the infrared light is reflected, by the polychroic mirror 104, through the objective lenses 108 to the sample 110. The infrared light is scattered at the interface between the far side of the cover slip 310 and the sample media, and a portion of the backscattered infrared light returns through the objective lens 108 and optical-path elements 104, 122, and 308. A portion of the backscattered infrared light passes through the beamsplitter 308 to an autofocus module 320. Additionally, the positions of the autofocus light source 302 and autofocus detector module 320 can be reversed about the beam splitter 308 with equivalent results, and the relative positions of the illumination source and autofocus light source may be changed, along with changes in the characteristics of other optical-path components, in various alternative configurations. It should be noted that the phrase "cover slip" is intended to include both traditional cover slips often employed in microscopy as well as surfaces of any of a large variety of different types of sample-chamber and sample-holding devices. Any of various interfaces that have fixed positions relative to the sample can be used as a source for backscattered autofocus light in order to detect and correct z-position dislocations of sample planes with respect to one or more objective lenses.

The autofocus module 320 periodically controls the stage drive 124 to translate the stage along the optical axis over a range of z-axis positions 322 and records the intensity of light at each z-axis position, at least conceptually generating an intensity versus z-position plot 324. The position within the z range corresponding to coincidence of the focal point of the objective lens with the far side of the cover slip is indicated by the z position 326 underlying the peak 328 of the intensity curve, since the highest intensity of backscattered light occurs when the distant side of the cover slip coincides with the focal point of the objective lens. There are a variety of different types of autofocus modules that carry out periodic z-axis scans in order to determine a current z-axis position of the stage platform at which the interface of the cover slip and sample media coincides with the focal point of the optical instrument. The autofocus module can then drive the electromechanical stage to a desired z-axis position relative to the determined z-axis position of the focal point, in order to reposition the focal point at a desired z-axis position within the sample.

Figure 4:
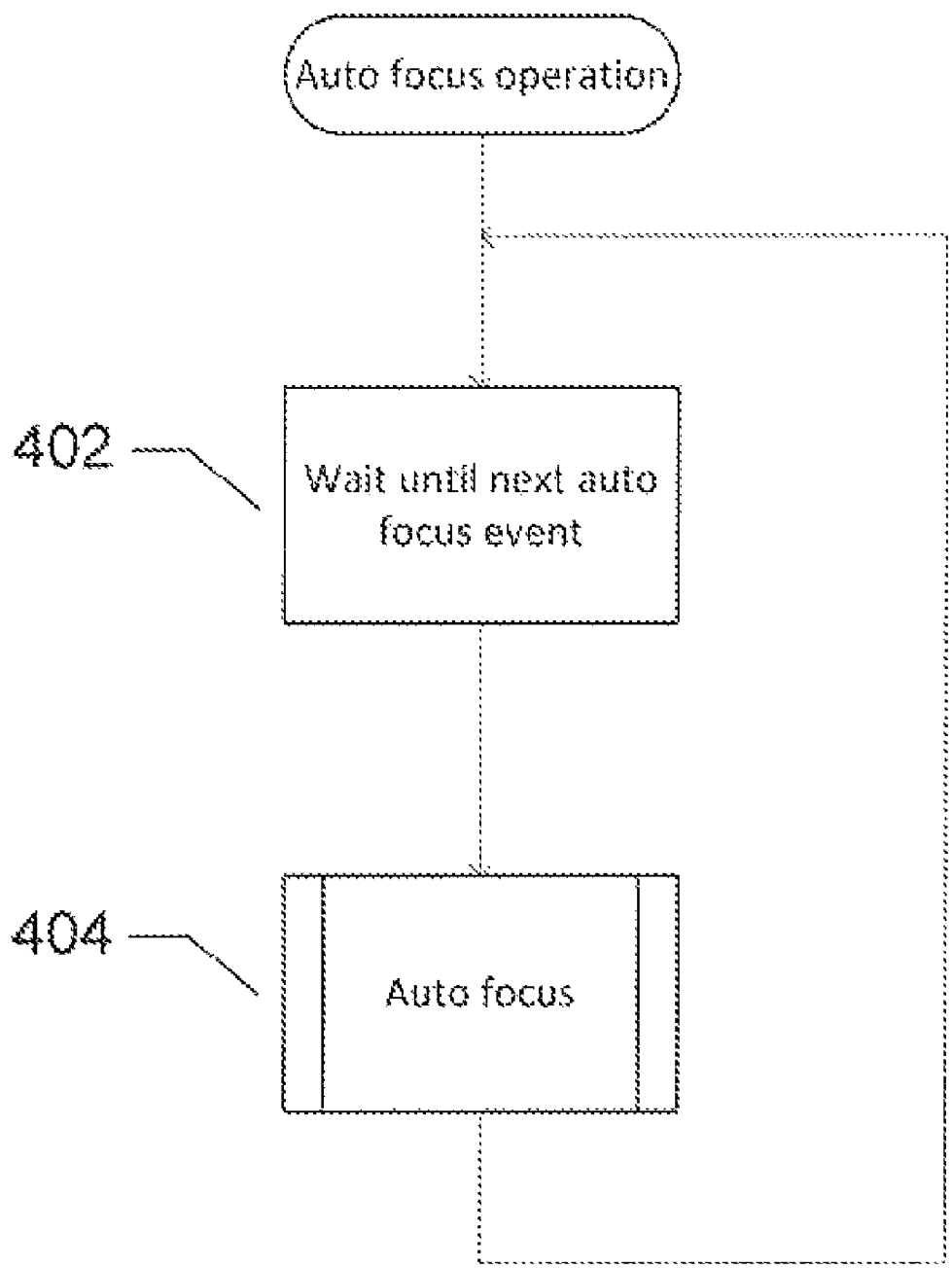
FIGS. 4 and 5 provide control-flow diagrams that illustrate operation of traditional autofocus modules.
Figure 5:
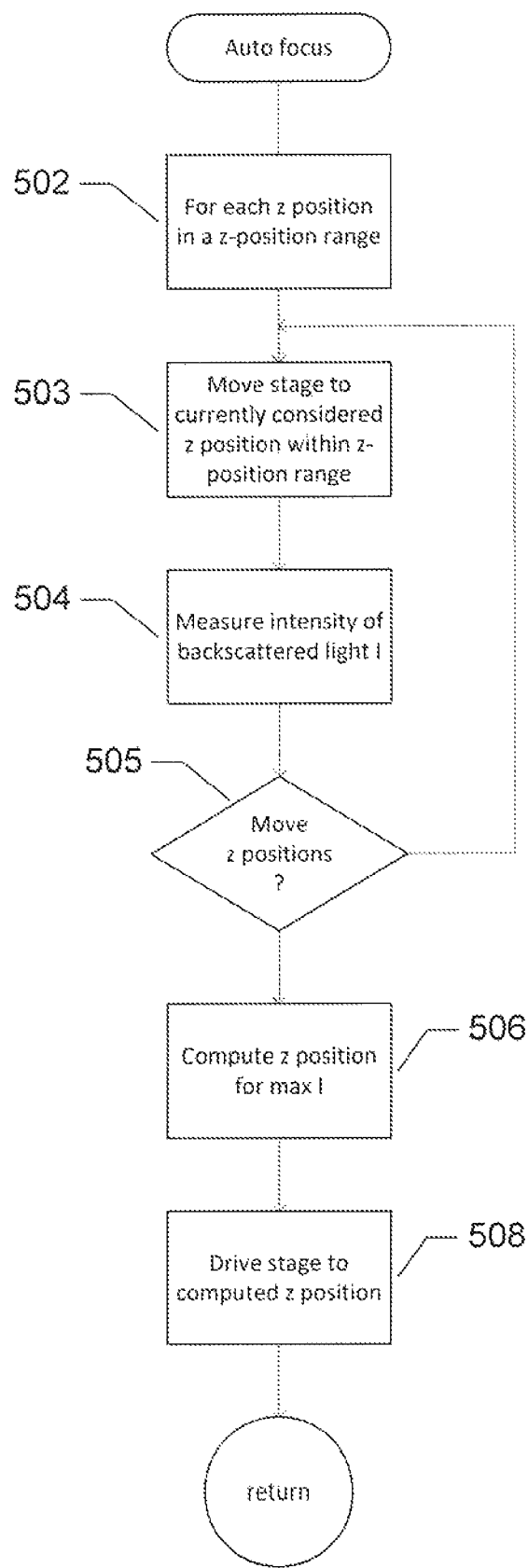

FIGS. 4 and 5 provide control-flow diagrams that illustrate operation of traditional autofocus modules. FIG. 4 provides a high-level control-flow diagram of a traditional autofocus operation. The autofocus operation is a continuous loop comprising steps 402 and 404. In step 402, the autofocus operation waits until a next autofocus event occurs, such as expiration am autofocus timer or manual input from an optical-instrument operator that invokes a next autofocus operation. Then, in step 404, the routine "autofocus" is called to carry out a scan over a range of z positions, as discussed above with reference to FIG. 3, in order to determine a current z position at which the focal point of the objective lens coincides with the far interlace of the cover slip with sample media. Although the autofocus operation is shown in FIG. 4 as a continuous loop, it should be noted that the actual autofocus operation, represented by the call to the routine "autofocus," occurs at discrete intervals in time, and that the autofocus operation is disruptive, generally interrupting other operations involving imaging or translation of the electromechanical stage.

FIG. 5 provides a control-flow diagram liar the routine "autofocus," called in step 404 of FIG. 4. In a for-loop of steps 502-505, the autofocus module controls the stage drive to scan through a range of z positions. For each z position within the range, the autofocus module drives the mechanical stage to the z position, in step 503, and measures the intensity of backscattered autofocus light, in step 504.

Once the backscattered-autofocus-light intensities are measured for each position within the range of z positions, in the for-loop of steps 502-505, the routine "autofocus" computes the z position corresponding to the maximum intensity of backscattered light, in step 506, and then, in step 508, drives the mechanical stage to a z position computed with respect to the z position computed in step 506. For example, it may be desired that the focal point be maintained at a constant z position of 10 microns within the sample, and so the autofocus computes a z position equal to 10 microns plus the current z position at which the optical instrument is focused on the far side of the cover slip, in step 508, and drives the electromechanical stage to that position.

Traditional or conventional autofocus subsystems, such as those discussed above with reference to FIGS. 3-5, are associated with many problems and deficiencies. One significant problem is that operation of the autofocus subsystem, as noted above, interrupts whatever other operations are being performed by the optical instrument. For example, when the optical instrument is conducting an x-y-plane scan of a sample, at fixed z position, each autofocus operation interrupts the scan in order to monitor the stability of the z position during the scan. The z-axis scan employed for autofocusing may add significant time to the time needed to acquire an image. A second deficiency associated with traditional autofocus subsystems is that, since the autofocus operation is carried out at discrete intervals in time, the z axis position of the instrument may drift, between autofocus intervals. Decreasing the interval between autofocus operations, in order to minimize z-axis drift, results in further increase in data-collection times. Yet another problem associated with autofocus operations is that, since the autofocus operation itself is carried out, over time, by moving the electromechanical stage through a range of positions, instrument and environmental instabilities may change during the autofocus operation, significantly decreasing the accuracy at which the instrument focal point position can be determined and z-axis drill corrected.

Figure 6:
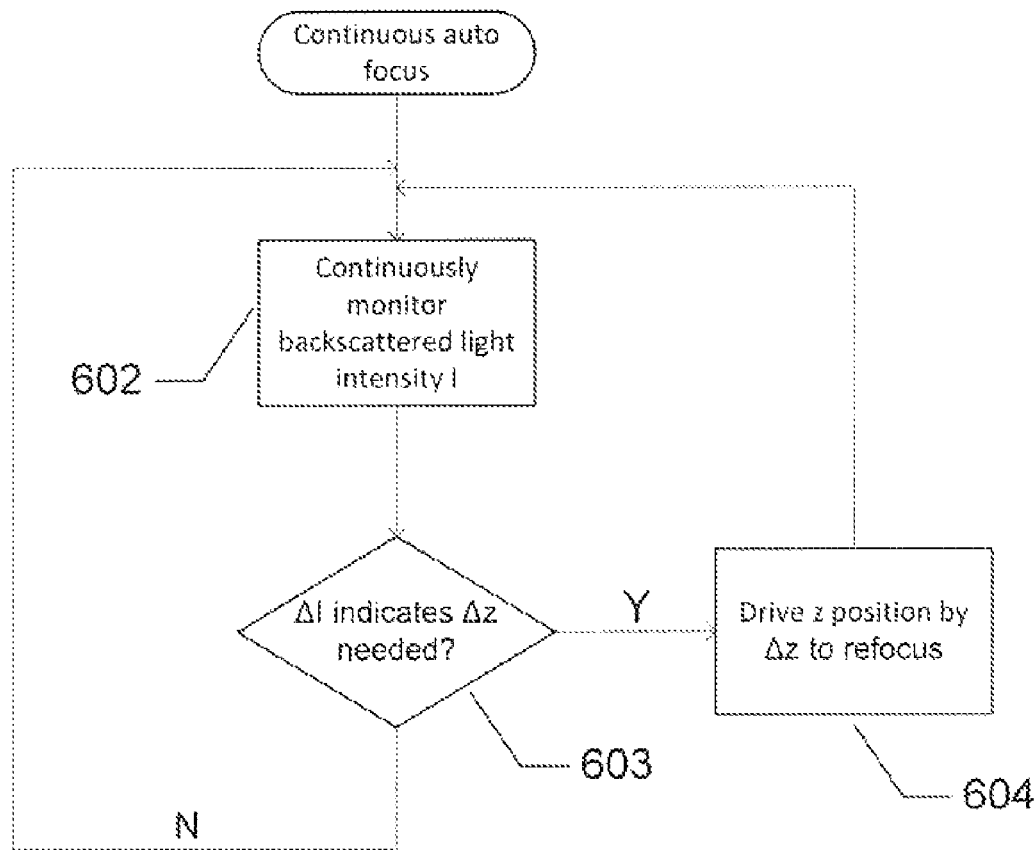
FIG. 6 provides a control-flow diagram that illustrates one aspect of certain embodiments of the present invention.

Embodiments of the present invention are directed to a continuously operating, rapid autofocus module that operates asynchronously with respect to operation of other optical-instrument components and subsystems, including translations of the electromechanical stage and image-acquisition operations. FIG. 6 provides a control-flow diagram that illustrates one aspect of certain embodiments of the present invention. The continuous, asynchronous auto-focus operation enabled by embodiments of the present invention is represented by a continuously executing loop of steps 602-604. In step 602, the z-axis position of the interface between the cover slip and sample media is continuously monitored, in one embodiment, by computing the z-axis position at which backscattered light from this interface produces highest intensity on an autofocus-module photodetector. When the z-axis position of the interface relative to the objective lenses changes, or when another z-axis position relative to the objective lenses changes, the electromechanical stage is drive through a small correction distance $\Delta z$, in step 604, to maintain a constant distance between the objective lens and a particular point or surface within a sample. Because the autofocus module that represents one embodiment of the present invention continuously operates, without interrupting operation of other components of an optical instrument, data-collection times are not impacted. And the focus of the optical instrument can be maintained more stably and with greater precision over time than by traditional autofocus modules. Because the autofocus module that represents one embodiment of the present invention continuously and rapidly recomputes the z-axis position of the far interface of the cover slip with sample media, the z-axis position of the objective lens relative to the interface of the cover slip can be continuously determined with greater accuracy than by traditional autofocus modules. Since the amount of time needed for each autofocus operation is much smaller than in traditional autofocus modules, and therefore the maximum amount of drift that can occur during the auto-focus operation is less, in the described embodiments of the present invention, than in traditional autofocus modules.

Figure 7A:
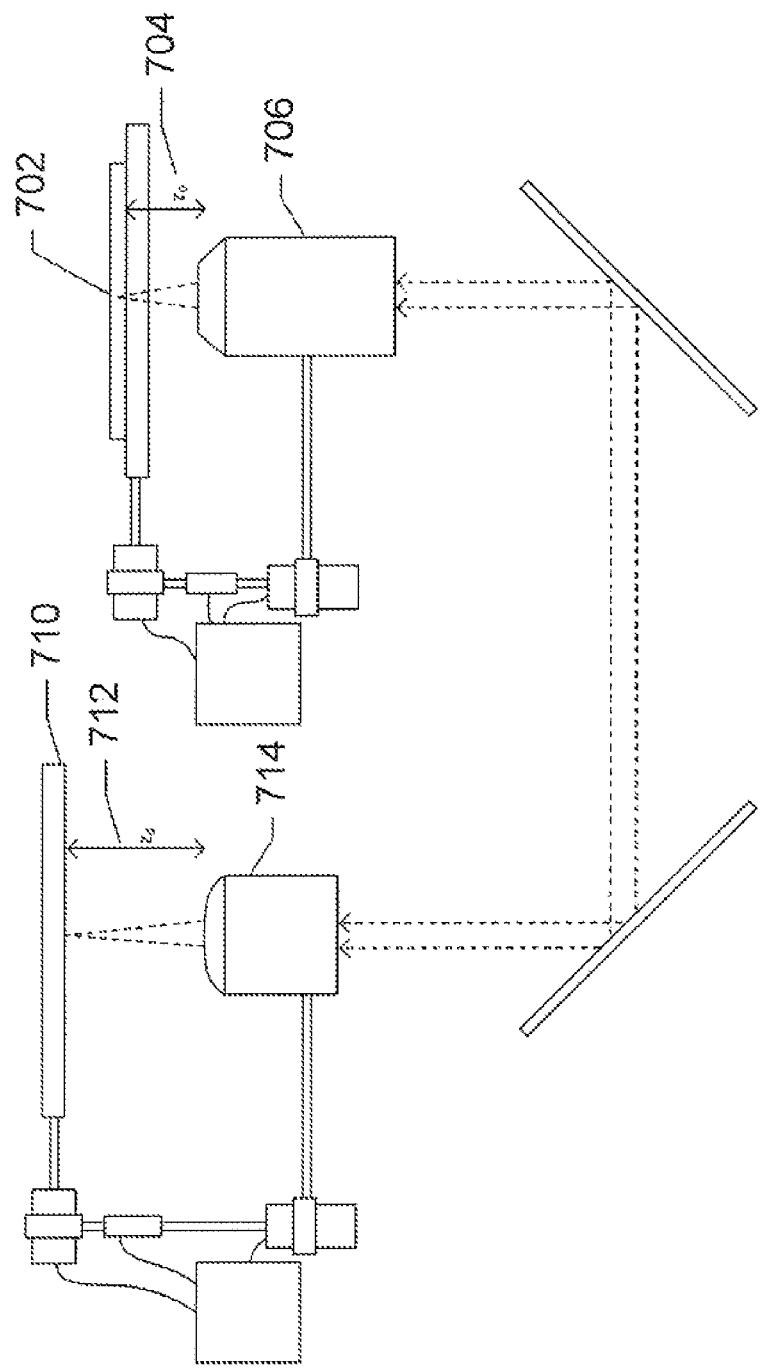
FIG. 7A-C illustrate a z-axis scan independent from the electromechanical stage of the fluorescence microscope discussed above with reference to FIGS. 1A-C and FIG. 3.
Figure 7B:
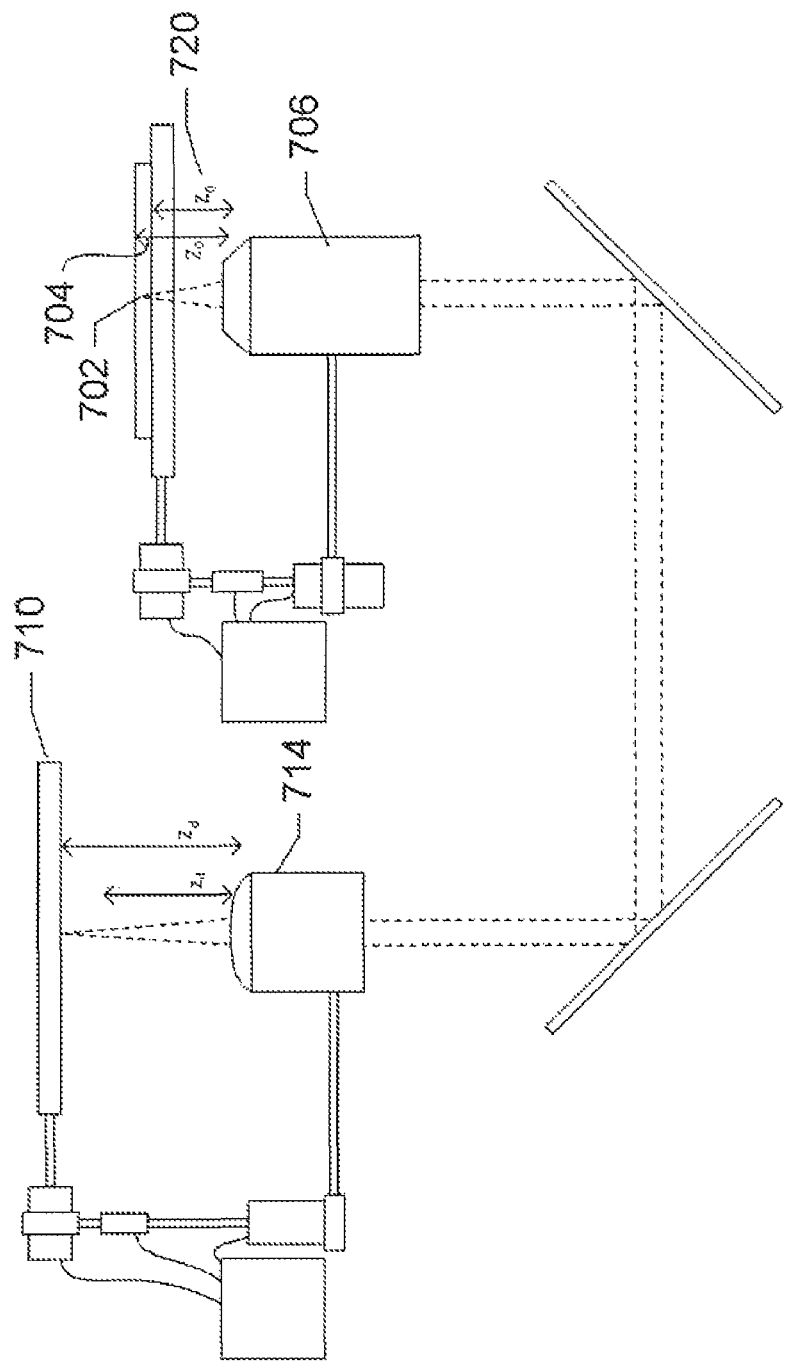
Figure 7C:
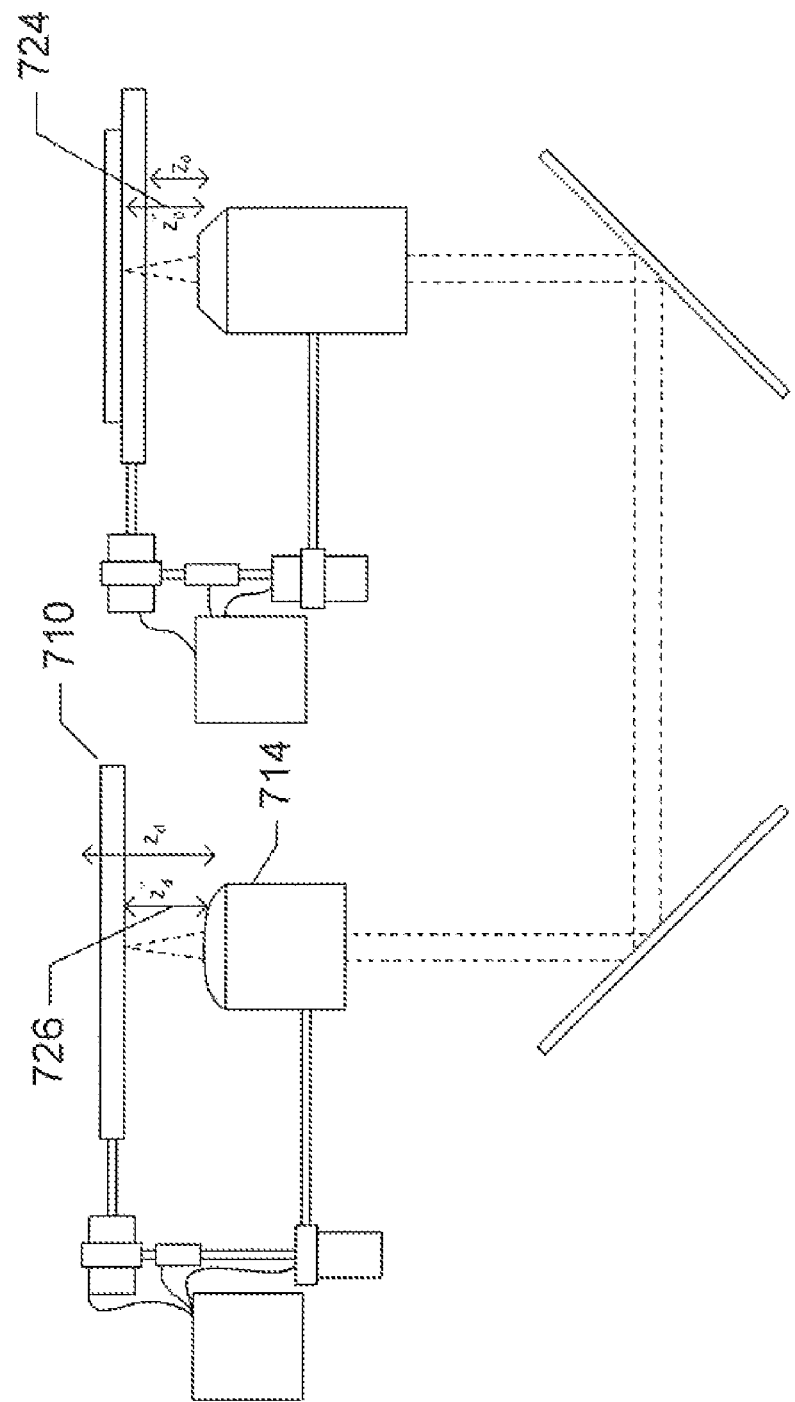

FIG. 7A-C illustrate a z-axis scan independent from the electromechanical stage of the fluorescence microscope discussed above with reference to FIGS. 1A-C and FIG. 3. FIGS. 7A-C illustrate a hypothetical system, similar to that shown in Figures 1A-C and 3, in which a detector within an autofocus module can be moved relative to a tube lens at the same time that a sample is moved relative to the objective lens in the z direction. In FIG. 7A, a point on the inner interface of the cover slip is held at a particular z-axis position $Z_o$ 704 from the objective lens or lenses 706. Backscattered light from the inner surface of the cover slip is focused onto a detector 710 held at a fixed z-axis position $z_d$ 712 relative to a focusing lens 714. In FIG. 7B, the mechanical stage has been moved closer to the objective lens, and the distance between the inner interface of the cover slip 702 to the objective lens 706 is now $z_o'$ 720, rather than the initial distance $z_o$ 704 shown in FIG. 7A. The detector 710 in the autofocus module has been moved a corresponding distance away from the focusing lens 714, so that the backscattered light from the inner cover-slip interface 702 remains focused on the detector. Similarly, as shown in FIG. 7C, when the stage is moved further from the objective than in FIG. 7A, with a distance between the inner cover-slip interface and objective of $z_o''$ 724, the detector 710 needs to be moved closer toward the focusing lens 714, with the result that the detector and focusing lens are separated by a shorter distance $z_d''$ 726, in order than the backscattered light from the inner cover-slip interface remains focused on the detector.

A z-axis scan can be carried out not only by moving the stage platform in the z direction relative to the objective lens, but can also be carried out by moving an autofocus-module detector relative to an autofocus-module focusing lens along the optical axis of the autofocus subsystem. When the detector is moved through a range of z positions relative to the focusing lens within the autofocus module, one z position within the range will correspond to the focal point of the focusing lens within the autofocus module, which, in turn, corresponds to the current distance in the z direction between the objective lens and an interface of the cover slip in the optical axis of the optical instrument. Changes in the distance between the objective lens and cover-slip interface, which the autofocus module seeks to detect and correct for, are reflected in changes in the focal length of the focusing lens at which backscattered light from the cover-slip interface is focused onto the autofocus module detector. Thus, a detector that can be physically or logically moved, in the z-axis direction, within the autofocus module with respect to a focusing lens, and that can determine when backscattered light from a cover-slip interface is focused on the detector, can be used to determine a position $z_d$ of the detector relative to the focusing lens, within the autofocus module, corresponding to the current distance $z_o$ between the objective lens and the interlace of the cover slip. This allows an absolute value for the distance between the objective lens and cover-slip interface to be determined by the relationship:

$$z_o = -\alpha \frac{1}{z_d}.$$

The proportionality constant $\alpha$ can be determined from the geometry of the optical path shared by the autofocus module and optical instrument and characteristics of the autofocus-module focusing lens and the objective lens or lenses of the optical instrument.

Figure 8:
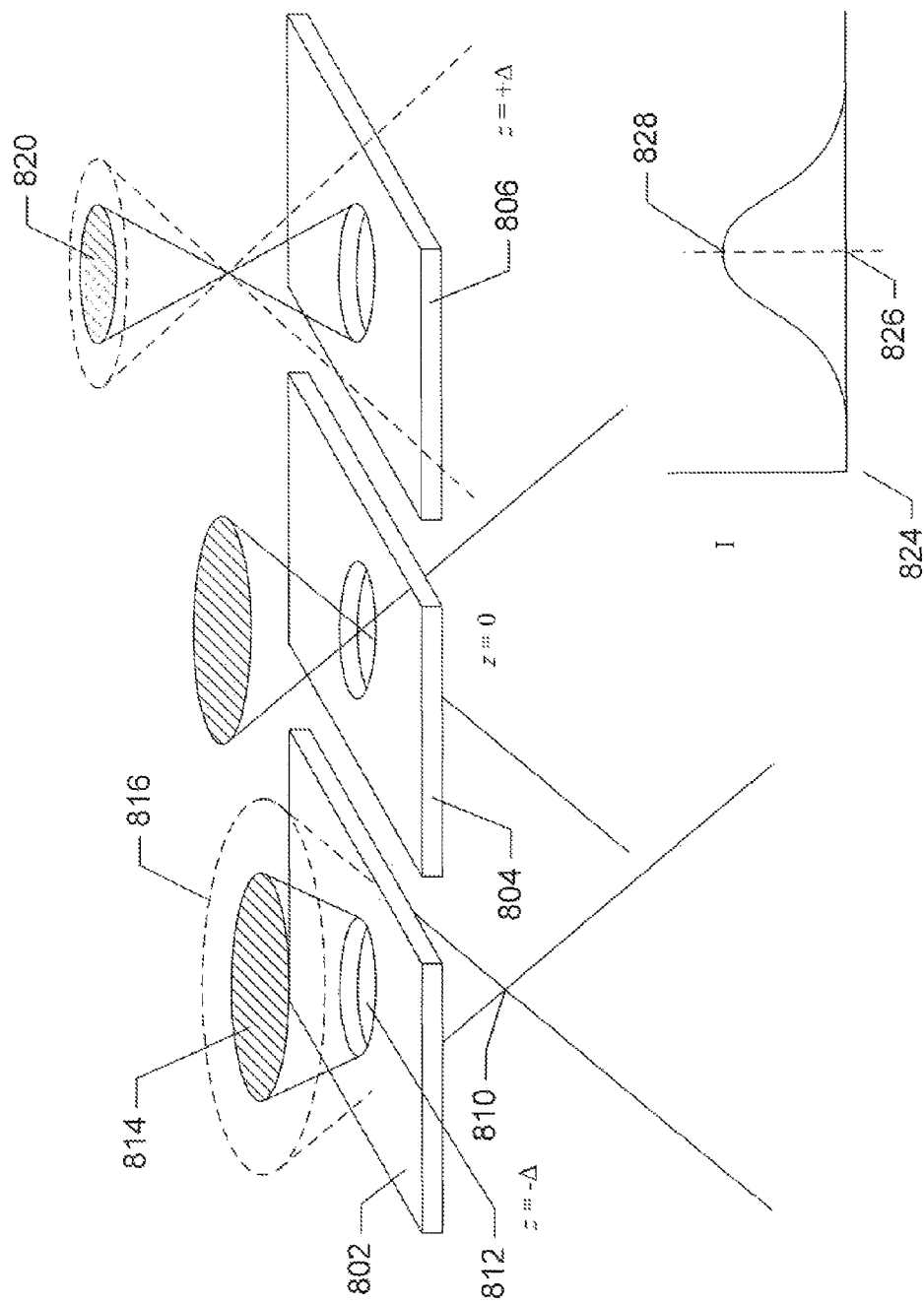
FIG. 8 illustrates a principal of operation of small-aperture focal-point detector.

FIG. 8 illustrates a principle of operation of a small-aperture focal-point detector. In FIG. 8, a small circular aperture within art opaque material is shown 802, 804. And 806 with respect to three different focused light beams. The first light beam is focused at a point 810 below the circular aperture 812, as a result of which a portion of the light beam falls onto the back side of the opaque material, and only a central conical portion of the light beam with circular cross-section 814 is passed through the circular aperture. Were the light beam not partially blocked by the opaque material, the circular cross-section 816 of the light beam, at the same distance from the focal point as circular cross-section 814, would have a greater diameter and area. Thus, the decrease in intensity of the light after passing through the aperture is proportional to the ratio of the area of circular cross-section 814 to the area of circular cross-section 816. When a light beam is focused at a point coincident with the aperture, as in example 804 of FIG. 8, all of the incident light passes through the aperture and the intensity of the light passed through the aperture is equal to the intensity of the light beam prior to passing through the aperture. When the focal point of the input light falls beyond the aperture, as shown in the third example 806 in FIG. 8, a portion of the input light prior to the focal point falls onto the back side of the opaque material; thus, as in the case 802, only a portion 820 of the focused light beam passes through the aperture. Thus; a photodetector, placed behind a small circular aperture. Which measures the intensity of a light beam passing through the small circular aperture can be used to indicate when the focal point of an input focused beam of light falls within the aperture. For example, a plot of the intensity detected by the photodetector versus the z position of a focusing lens relative to the circular aperture reveals the z=0 826 z-axis position of the pinhole aperture relative to the focusing lens at which the light is focused by the focusing lens within the aperture as the point on the horizontal axis of the plot 824 corresponding to the peak of measured intensity 828.

A mechanical drive for moving the detector relative to a focusing lens. As discussed with reference to FIGS. 7A-C, in which the detector comprises a photodetector placed at an appropriate distance behind a pinhole aperture, as shown in FIG. 8, could be used for determining the distance $z_d$ between the pinhole aperture and focusing lens corresponding to the focal point of light backscattered from a cover-slip interface. However, a mechanically movable detector would be expensive, and suffer the same time delays associated with scanning in the z direction by the optical instrument. Rather than using a focal-point detector that can be scanned in the z direction, as in FIGS. 7A-C, embodiments of the present invention employ a fixed photodetector and rapidly translating pinhole aperture or rapidly, incrementally extending focused beam to carry out z-axis scans within an autofocus module that represents an embodiment of the present invention.

Figure 9A:
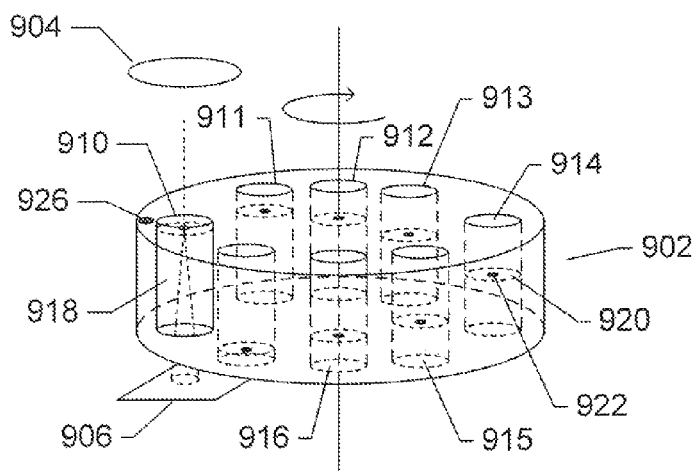
FIGS. 9A-C illustrate a pinhole-aperture rotor that represents one embodiment of the present invention.
Figure 9B:
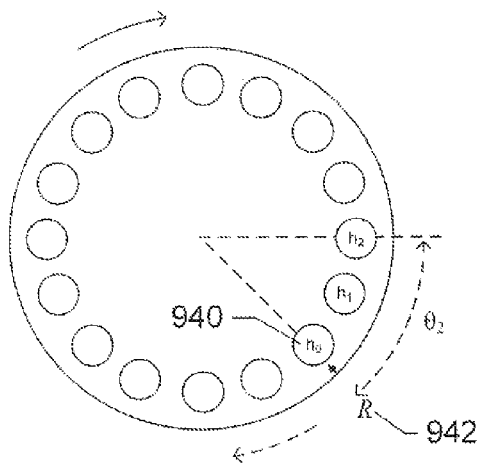
Figure 9C:
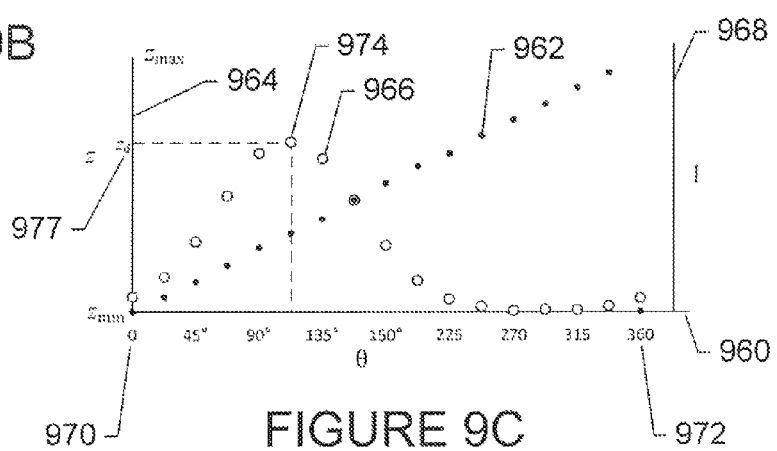

FIGS. 9A-C illustrate a pinhole-aperture rotor that represents one embodiment of the present invention. The pinhole-aperture rotor 902 is interposed between a focusing lens 904 of an autofocus module 904 and a photodetector 906 within the autofocus module that measures the intensity of light falling on the photodetector. The pinhole-aperture rotor 902 includes a number of vertical, cylindrical shafts through which light passes from the focusing lens 904 to the photodetector 906 when the vertical, cylindrical shaft is rotated to a position between and aligned with the focusing lens and photodetector, as is vertical. Cylindrical shaft 918 in FIG. 9A. Each vertical, cylindrical shall contains an opaque disk with a central pinhole, such as opaque disk 920 with central pinhole aperture 922 within vertical, cylindrical shaft 914. The opaque disks are located at different distances from the top plane of the pinhole-aperture rotor in each of the different vertical, cylindrical shafts. As shown in FIG. 9A. The distance between the top plane of the rotor and the pinhole aperture increases linearly with increase in the numeric labels of the vertical, cylindrical shafts, forming a range of z-axis positions of pinhole apertures within the vertical, cylindrical shafts of the pinhole-aperture rotor 902. The pinhole-aperture rotor 902 includes at least one physical index 926 that can be read by an index detector within the autofocus module to determine when a particular vertical, cylindrical shaft is positioned to transmit light from the focusing lens 904 to the photodetector 906. Detection of the position of the physical index 926 and knowledge of the rotational speed of the pinhole-aperture rotor can together be used to compute times at which each vertical, cylindrical shaft is aligned to pass light from the focusing lens to the photodetector as the pinhole-aperture rotor is rotated at a constant speed by an electrical motor. The physical index may be a magnetic disk, light-emitting diode, reflective plate, or other type of physical index, the position of which can be determined quickly by an index detector, such as an electromagnetic coil, photodetector, or laser/photodetector, as the physical index rotates through a particular position.

FIG. 9B shows the pinhole-aperture rotor when viewed in a direction parallel to the z axis. When a first vertical, cylindrical shaft 940 is aligned with a focusing lens and a photodetector at a reference position R 942, the remaining vertical, cylindrical shafts $h_1$-$h_{n+1}$ are positioned at increasing rotational angles $\theta_1$-$\theta_{n-1}$ with respect to the aligned, vertical, cylindrical shaft 940. In the plot provided in FIG. 9C, where the rotational angles of the pinhole-aperture rotor are plotted over a range of 0 to 360 degrees with respect to the horizontal axis 960, filled-in circles, such as filled-in circle 962, represent z positions of each pinhole aperture with respect to the photodetector, plotted with respect to a left-hand vertical z-position axis 964, and open circles, such as open circle 966, represent intensity detected by the photodetector plotted with respect to a right-hand vertical intensity axis 968. As the pinhole-aperture rotor rotates from 0 degrees (970 in FIG. 9C) to 360 degrees (972 in FIG. 9C), the distance between the pinhole aperture within the currently aligned vertical, cylindrical shaft and photodetector increases while the measured intensity at the photodetector peaks 974 at a particular rotational angle 976 corresponding to a particular pinhole-aperture-to-photodetector $z_d$ distance 977. Thus, the combination of a rotating pinhole-aperture rotor 902 and fixed-position photodetector 906 can be used to rapidly and repeatedly scan through z-axis positions, within an autofocus module that represents one embodiment of the present invention, to determine a distance $z_d$ between a pinhole aperture and focusing lens at which the measured intensity is greatest. That distance is related, as discussed above, to the distance between the objective lens and an interface of the cover slip in the optical instrument.

Figure 10A:
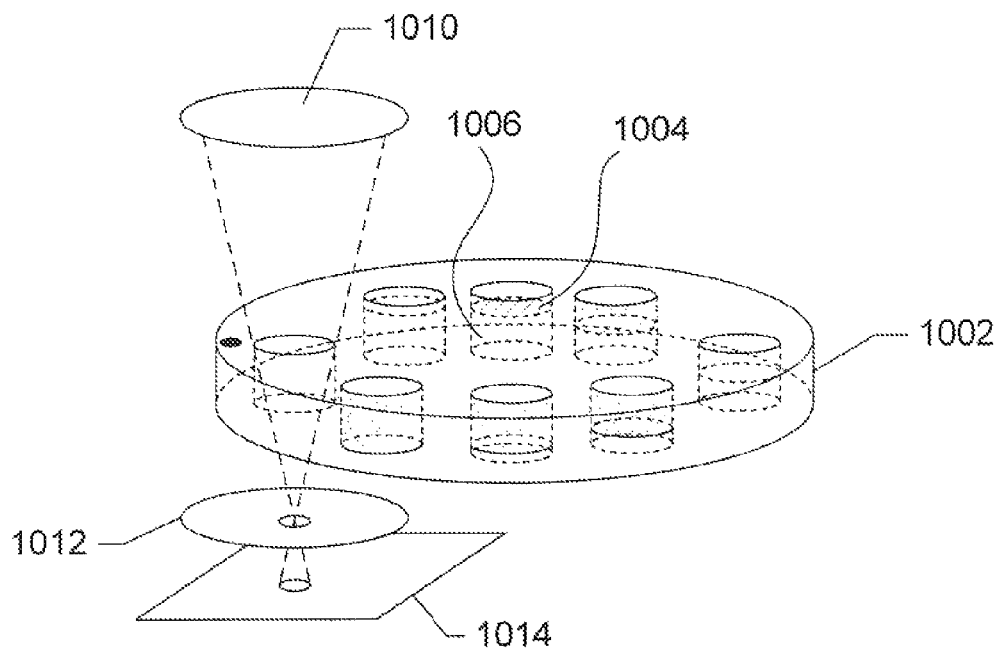
FIGS. 10A-B illustrate a different type of rotor used in an alternative embodiment of the present invention.
Figure 10B:
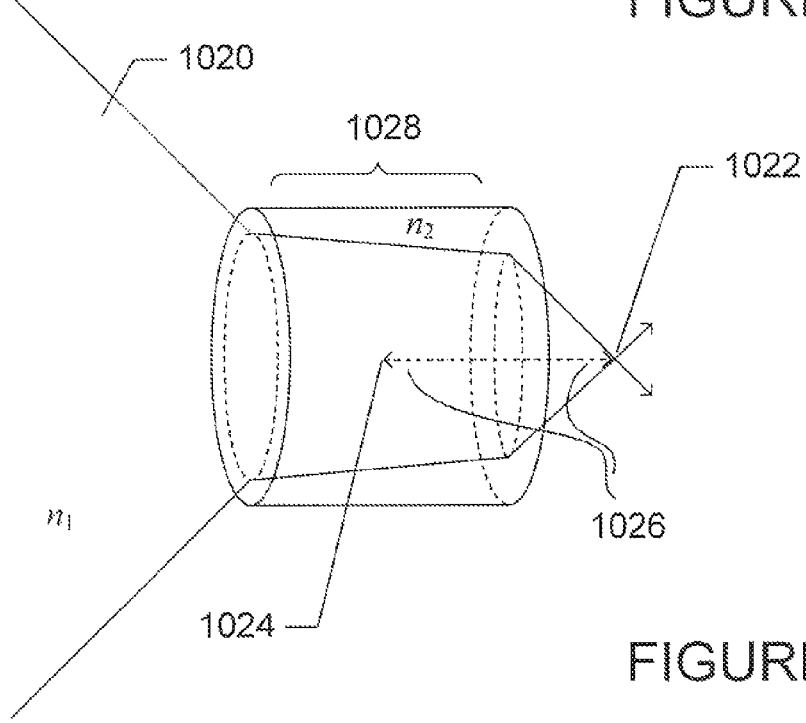

FIGS. 10A-B illustrate a different type of rotor used in an alternative embodiment of the present invention. As shown in FIG. 10A, rather than placing pinholes at different distances within vertical, cylindrical shafts of an pinhole-aperture rotor, as in FIG. 9A, in an alternative embodiment of the present invention, a path-extending rotor 1002 includes solid cylindrical rods of glass or another transparent material of various heights, or thicknesses, within the cylindrical, vertical shafts of the path-extending rotor. Alternatively, rather than having varying heights, the solid cylindrical rods may have equal heights, but may be composed of different materials with different refractive indexes. In essence, these can be thought of as disk-shaped windows that provide varying degrees of focus-extension, or focus-extension lengths. In FIG. 10A, the focus-extension windows are indicated by cross-hatching, such as window 1004 within cylindrical vertical shall 1006 of the path-extending rotor 1002. The path-extending rotor is rotated so that successive vertical, cylindrical shafts are aligned with an optical path between the focusing lens 1010 and a pinhole aperture 1012 positioned above a photodetector 1014. As shown in FIG. 10B, a transparent cylindrical rod of a material with index of refraction $n_2$ is greater than that of air $n_1$ refracts an input focused beam 1020 in a way that extends the distance of the focal point 1022 of the focused beam from the focal point 1024 that the beam would have in the absence of the transparent cylindrical rod by a distance 1026 proportional to the height 1028 of the cylindrical rod. Thus, by including windows of increasing thicknesses or increasing refractive index in the path-extending rotor 1002, and by rotating the rotor to successively scan through the vertical, cylindrical shafts containing the windows, the path-extending rotor can be used, just as the pinhole-aperture rotor 902 in FIG. 9A, to effect a z-axis scan within an autofocus model that represent one embodiment of the present invention. Rotation of the path-extending rotor produces z-axis/intensity plots with respect to rotation angle similar to plot 9C for the pinhole-aperture rotor 902 in FIG. 9A.

Figure 11:
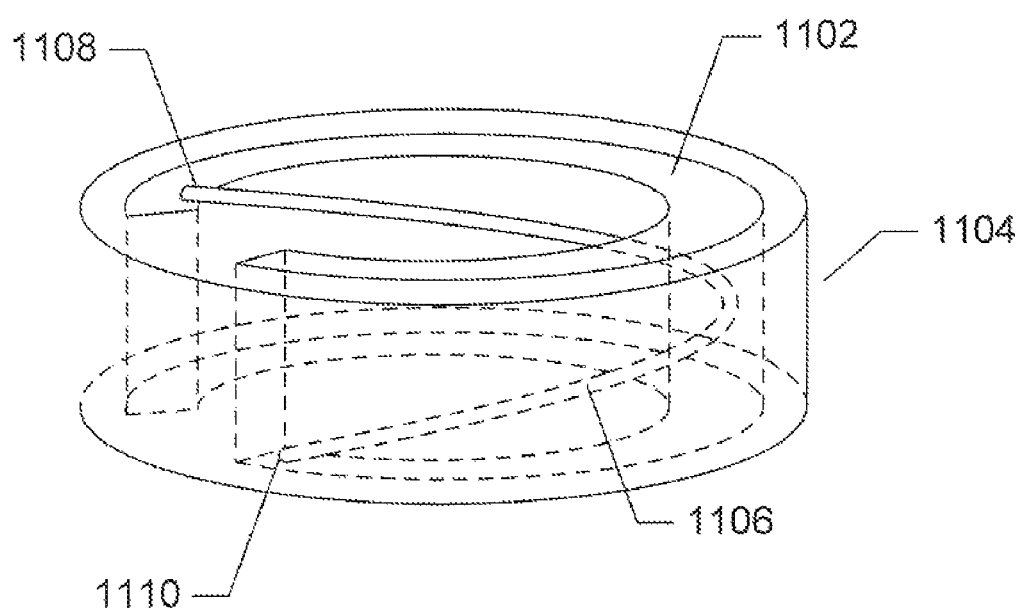
FIG. 11 shows a third type of rotor used in additional embodiments of the present invention.

FIG. 11 shows a third type of rotor used in additional embodiments of the present invention. This rotor is similar to the pinhole-aperture rotor shown in FIG. 9A, with a difference that, rather than using a series of vertical, cylindrical shafts, an almost circular slot 1102 within a rotor 1104 is employed, with a helical slit aperture 1106 and surrounding opaque helically formed material firming continuous slit aperture that continuously descends, in z-axis position from a maximum z position 1108 to a minimum z position 1110. In additional embodiments, spoke-like members are employed to hold the inner portion of the slit-aperture rotor to the outer portion of the slit-aperture rotor.

The various autofocus rotors discussed above with reference to FIGS. 9A-11 feature uniformly decreasing or increasing z position of apertures or uniformly increasing or decreasing window thicknesses, in the case of the path-extension rotor, with rotation or displacement angle, with a single discontinuity, such as the discontinuity between z position of pinhole apertures between vertical shafts 917 and 918 in FIG. 9A. However, particularly when physical indexes are used to identify each vertical, cylindrical shaft, the z positions or window thicknesses may be arbitrarily varied, with rotation angle, and measured intensities mapped to z position by a mapping table or function. Even in the case that only one or a few physical indices are used, an arbitrary arrangement of window thicknesses or z positions can be computationally managed by an autofocus subsystem, provided that the window thickness or z position of the aperture within the vertical shaft at each displacement angle of the rotor is known and available in memory or on a mass-storage device. In certain embodiments of the present invention, multiple vertical shafts may contain identical windows or z positions of apertures, and, in certain cases, the z positions or window thicknesses may vary sinusoidally, so that there are no discontinuities in window thickness or z position with rotor rotation.

Figure 12:
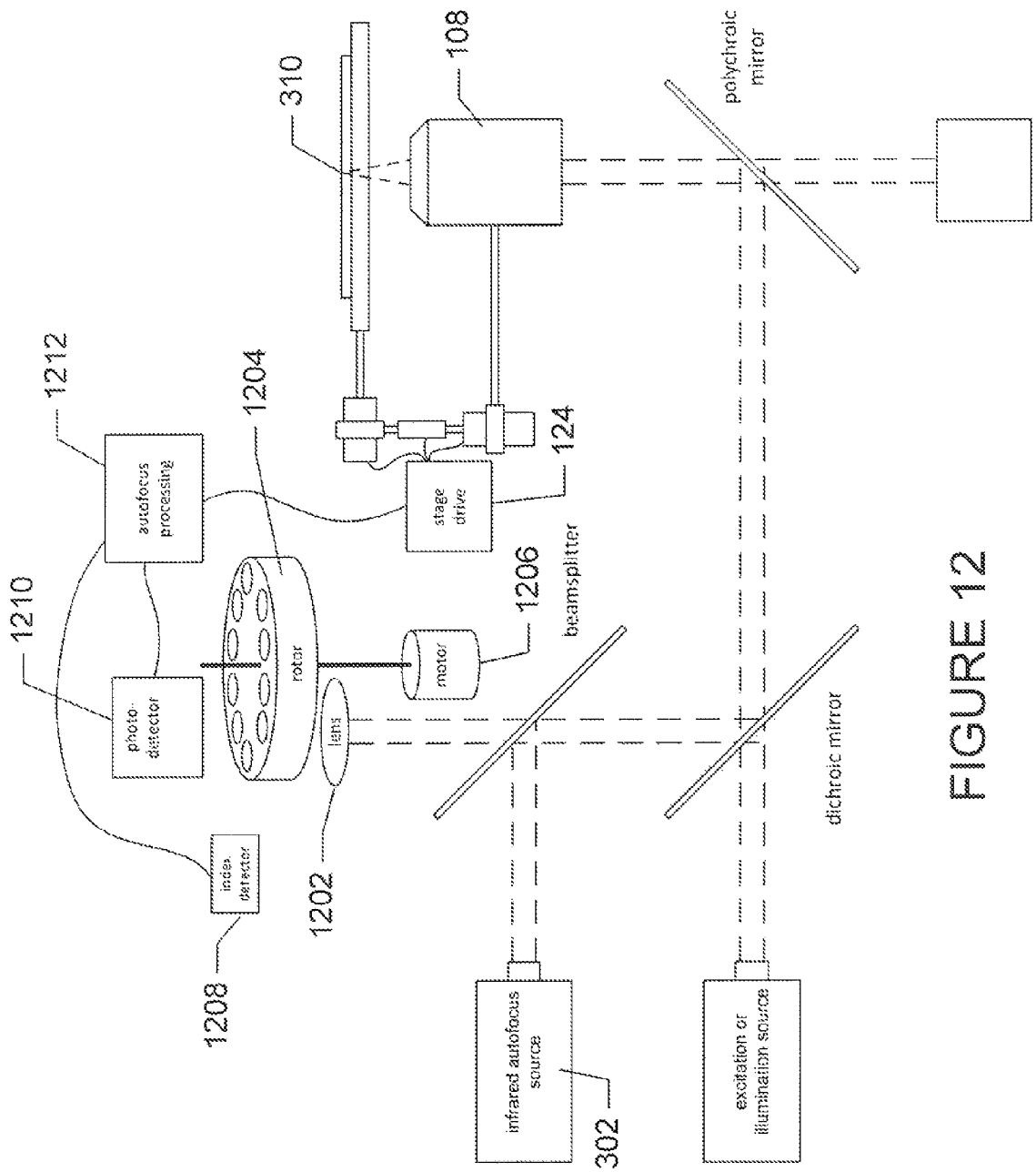
FIG. 12 illustrates an autofocus module that represents one embodiment of the present invention incorporated within the optical path of a fluorescence microscope that also represents one embodiment of the present invention.

FIG. 12 illustrates an autofocus module that represents one embodiment of the present invention incorporated within the optical path of a fluorescence microscope that also represents one embodiment of the present invention. FIG. 12 uses the same illustration conventions as used in FIGS. 1A-C, 3, and 9A-11. The autofocus module includes a focusing lens 1202, an autofocus rotor 1204 mounted to an axial shaft that is spun by an electrical motor 1206, a rotor-index detector 1208, a photodetector 1210, and an autofocus-processing component 1212 that computes z-axis position based on measured intensities of light passing from the focusing lens 1202 through the rotor 1204 onto the photodetector 1210 in a continuous fashion. In certain embodiments of the present invention, the rotor may be spun at speeds in excess of 1000 revolutions per minute, allowing computation of the distance between the objective lens and cover-slip interlace to be computed at rates of ten per second or greater. The rotor 1204 may be an pinhole-aperture rotor, as discussed above with reference to FIGS. 9A-C, a path-extending rotor, as discussed above with reference to FIGS. 10A-B, a slit-aperture rotor, as discussed above with reference to FIG. 11, or another type of rotor that alone, or in combination with a pinhole aperture at a fixed distance with respect to the photodetector in the optical path between the focusing lens 1202 and photodetector 1210, carries out a z-axis scan of autofocus light produced by the autofocus light source 302 and scattered from a cover-slip interface 310. The autofocus-processing component 1210 continuously computes Δz corrections and issues Δz translation directives to the stage drive 124 in order to continuously reposition the mechanical stage so that the distance between the objective lens 108 and cover-slip interface 310 remains constant. As discussed above, while the autofocusing module that represents one embodiment of the invention employs light backscattered from a cover-slip interface, or light backscattered from another interface that has a fixed position relative to the sample, to compute the distance, in the direction, between the objective and the cover-slip interface, the autofocus module that represents one embodiment of the present invention can be used to stably maintain a focal point of the objective lens with respect to the tube lens and detector of the optical instrument at an arbitrarily selected position within a sample. Again, the phrases "cover-slip interface" and "cover slip" are intended to broadly cover any of the various types of interfaces that can be employed as sources of backscattered autofocus light by an autofocus system. It should be noted that the autofocus modules that represent embodiments of the present invention may be incorporated in various ways into optical instruments. In many cases, the autofocus module may be manually or automatically activated to carry out autofocus for specified or computed periods of time. In other cases, the autofocus subsystem may be activated programmatically, during certain types of image-acquisition modes. In all cases, the autofocus subsystem may be manually or automatically disengaged, during normal z-translations of the optical instrument and at other times.

Figure 13A:
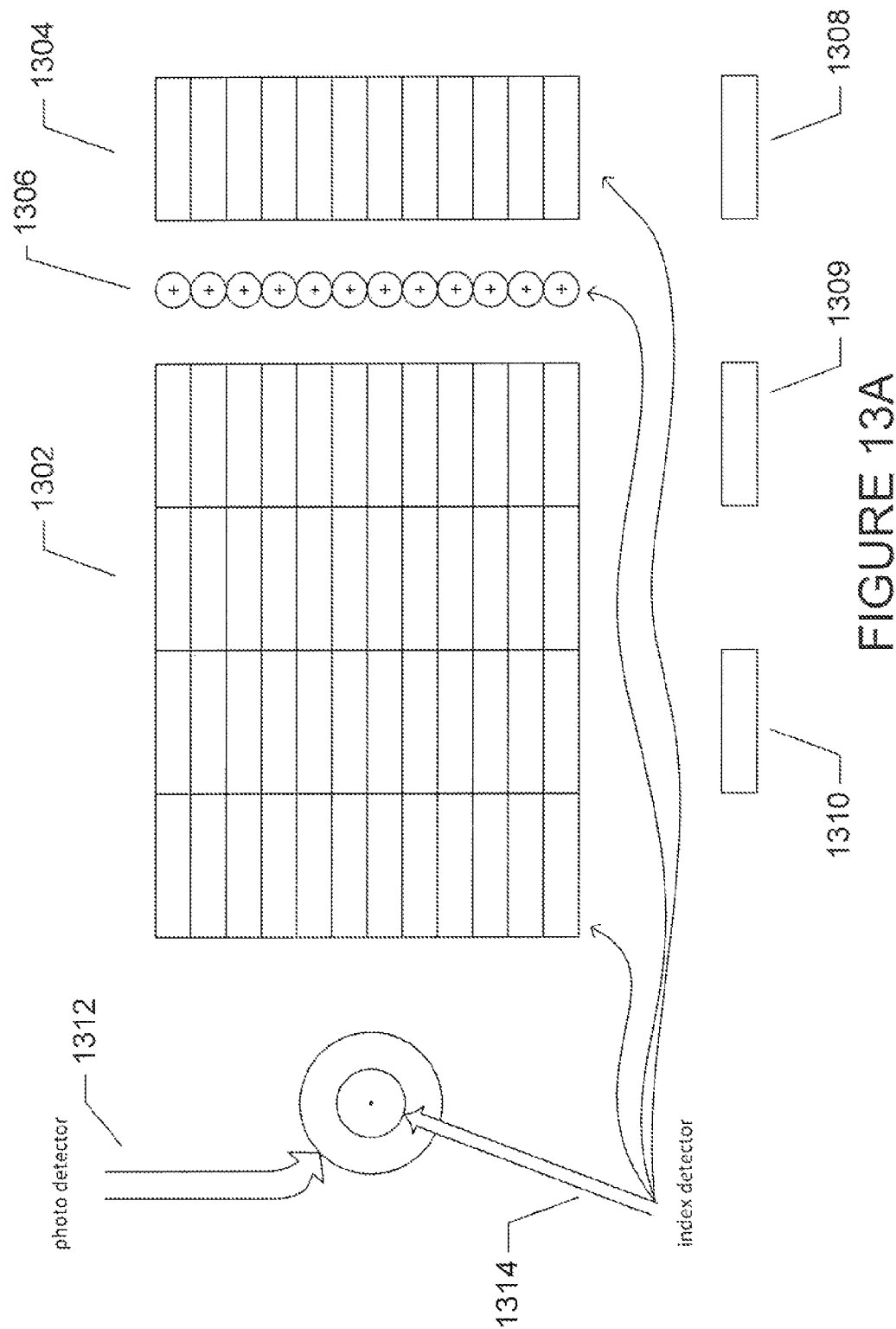

FIGS. 13A-1 illustrate one approach to computing the current distance between the objective lens and cover-slip interface of a microscope by the autofocus-processing subcomponent of an autofocus module that represents one embodiment of the present invention. The method employs an array of shift registers 1302, an additional array of registers 1304, an array of summation operators 1306, three additional registers 1308-1310, a photodetector input 1312, and a rotor-index detector input 1314. The registers and register-components of shift registers have an appropriate size, in bits, to contain a numerical value equal to three times the maximum-valued intensity values reported by the photodetector, in the described embodiment of the computing subsystem that represents one embodiment of the present invention. In general, 16-bit or 32-bit registers are of sufficient size for accurate z-position computation.

The z-position computation logic, embodied in circuits and/or firmware or software and illustrated in FIGS. 13A-I, computes the relative position of a cover-slip interface with respect to the objective lens with a frequency equal to the rotation frequency of a rotor within an autofocus module that represents one embodiment of the present invention. Photodetector input 1312 is a numerical value that represents the intensity of light detected by the photodetector at a particular point in time. Index detector input 1314 selects mappings between points in time and particular shift registers, as well as selecting points in time to carry out parallel shift operations, parallel summation operations, and other operation that together compute positions at the frequency of rotor rotation within an autofocus module that represents one embodiment of the present invention.

Figure 13B:
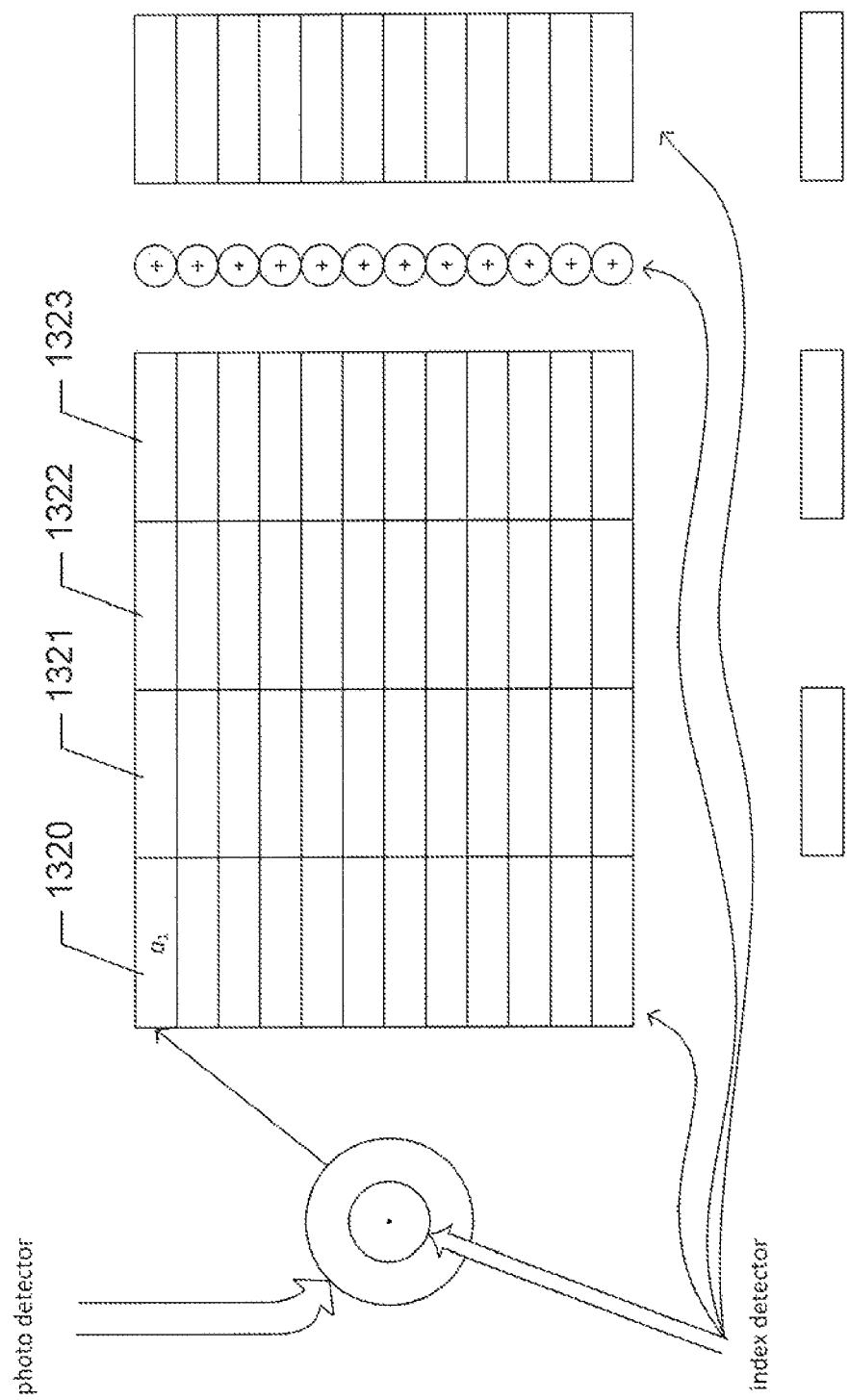
Figure 13C:
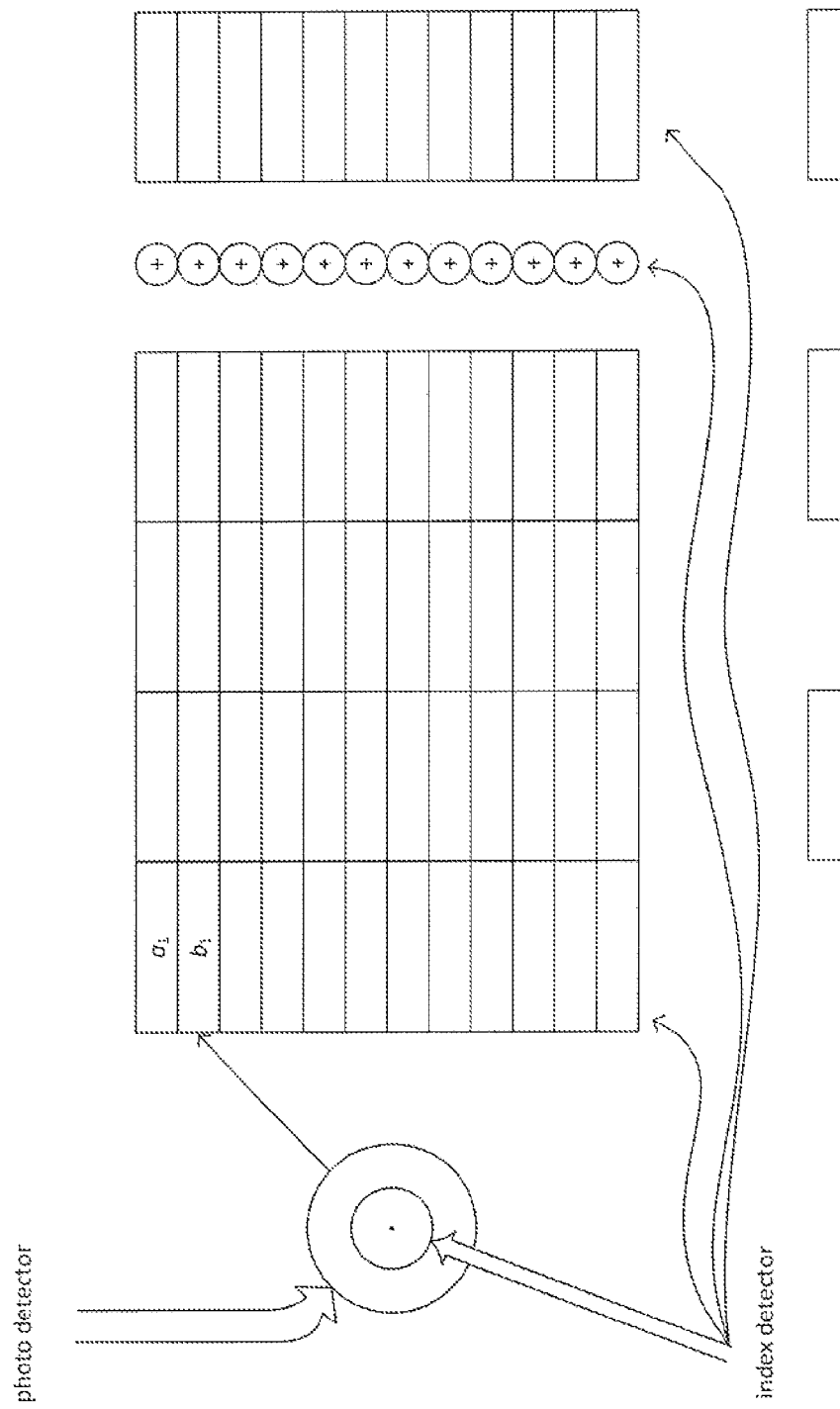
Figure 13F:
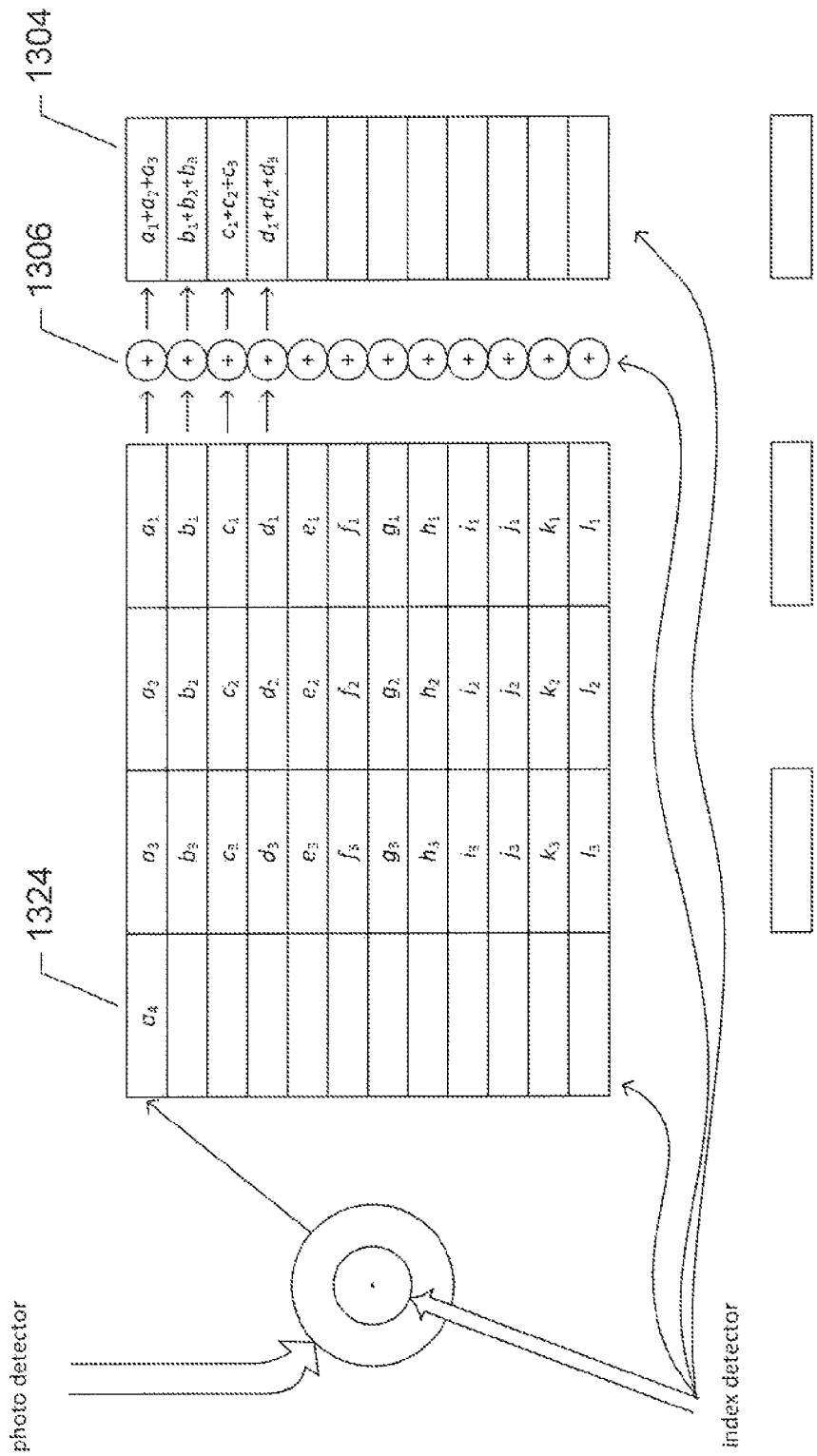
Figure 13G:
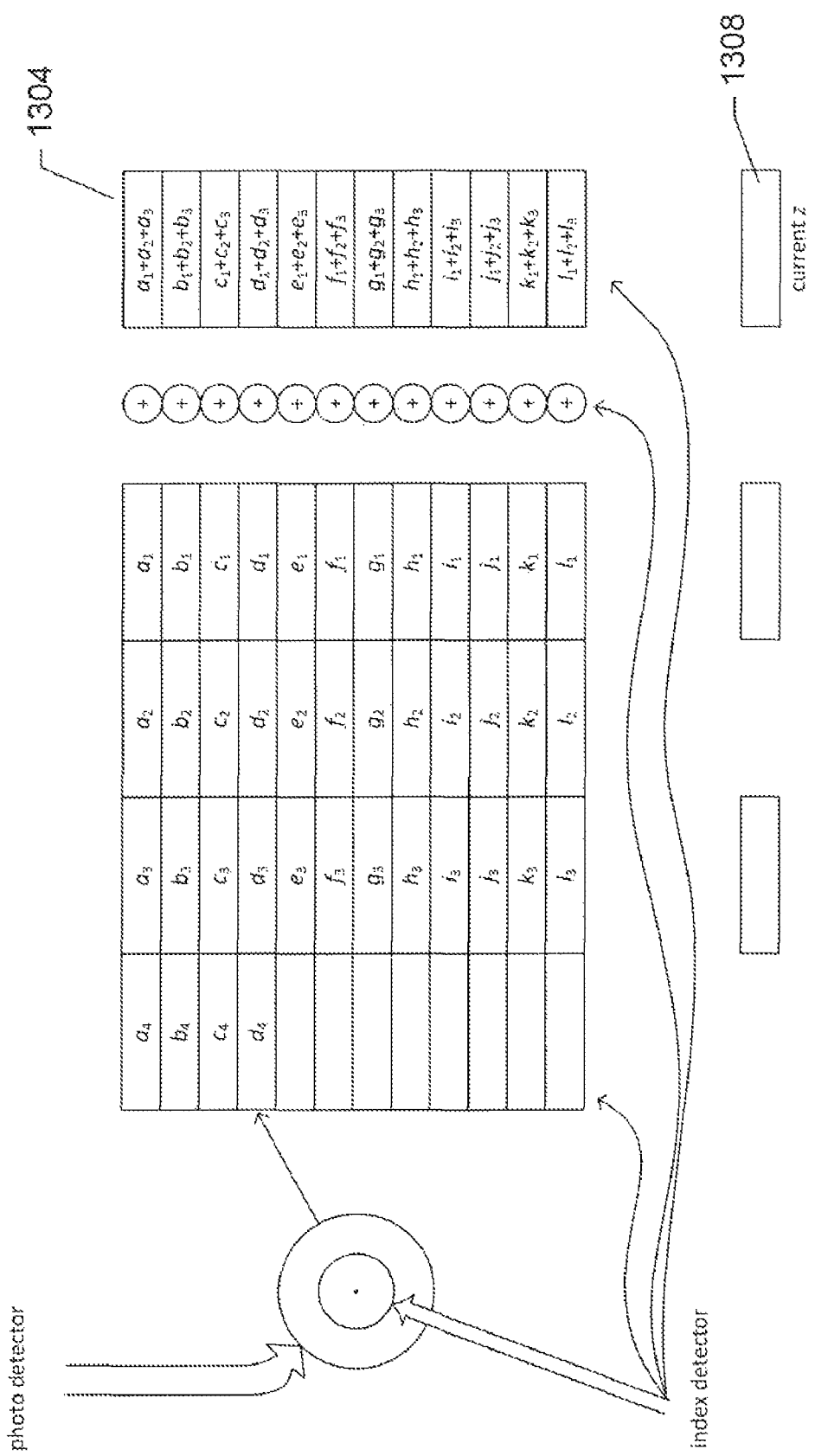
Figure 13H:
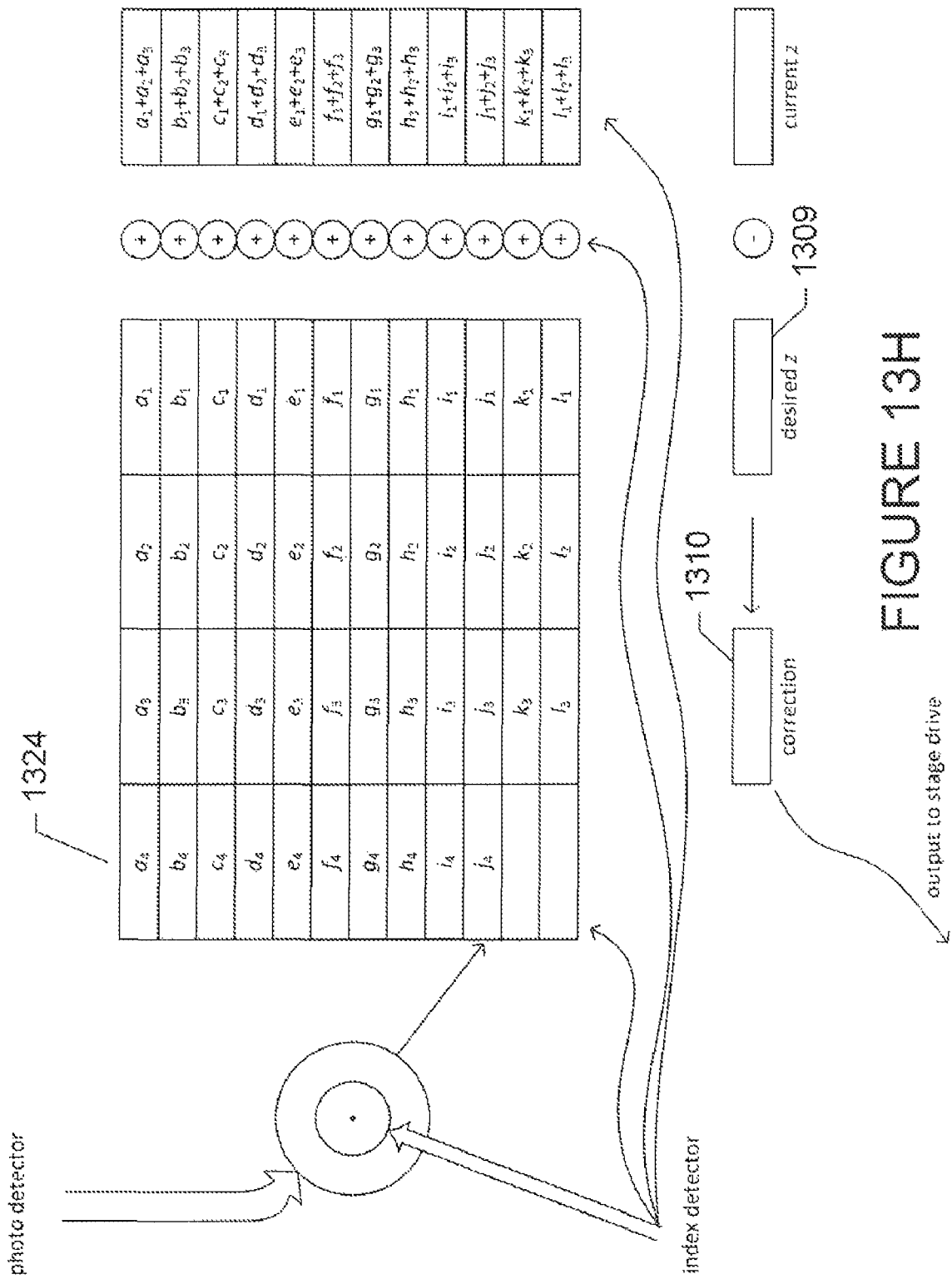
Figure 13I:
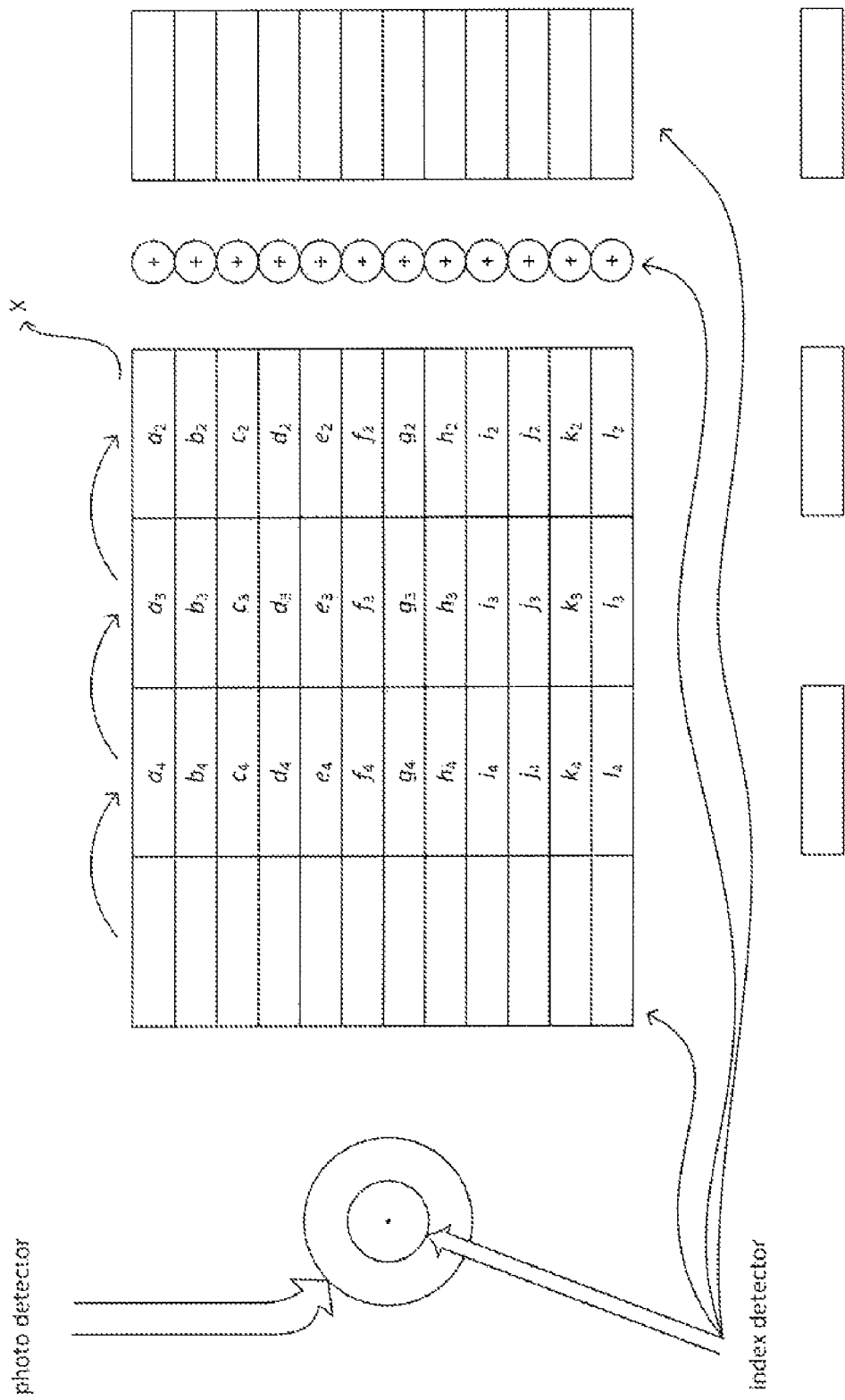

Computation is both highly parallel and includes asynchronous aspects. As shown in FIGS. 13B-D, as the rotor within the autofocus module that represents one embodiment of the present invention rotates, and as the index detector determines points in time at which particular cylindrical holes of the rotor are aligned with the optical path of the autofocus module, photodetector intensity values are input into the first registers of each four-register shift register. In FIG. 13B, the intensity value $a_1$ corresponding to a first rotor shaft is placed into the first register 1320 of a first shift register comprising registers 1320-1323. In FIG. 13D, the rotor has made a complete revolution, resulting in intensity values placed into all of the first registers of the array of shift registers. Then, at the completion of one rotation, the parallel shill registers shift all of the values rightward by one place, as shown in FIG. 13F. Thus, the column of values 1324 in the array of shift registers is shifted, by the parallel shill operation, to column 1326 in FIG. 13E. The values in the final column of registers 1328 are discarded. As shown in FIG. 13F, following the parallel shift operation shown in FIG. 13E, concurrently with tilling of the first column 1324 registers in the array of shift registers with a next series of intensity values, the parallel summation operators 1306 are activated to compute the sums of the final three registers in each four-register shift register, and the sums are placed into the column of registers 1304. The summation process is carried out, in parallel, asynchronously with respect to transfer of new photodetector values into the first column 1324 of registers within the array of shift registers. When the summations are completed, a microprocessor-implemented routine is called in order to compute a z-axis position within a range of z-axis positions corresponding to the maximum-detected intensity within the column of registers 1304. Note that this process is averaged over the three most recent scans of the rotor. The computed z-axis position is placed into register 1308 to represent the current distance in the z direction between the objective lens and a cover-slip interface, as shown in FIG. 13G. Then, as shown in FIG. 13H, current z position is subtracted from a desired z position, stored in register 1309, to produce a Δz correction, stored in register 1310, which is then output to a stage drive. Notice that computation of Δz correction proceeds in parallel with filling of the first column 1324 of parallel-shift-register registers with a next set of intensity values obtained from photodetector input. When the next set of intensity values has been obtained, as shown in FIG. 13I, the parallel shift register is activated to shift the columns of intensity values by one place, to prepare for computation of a next Δz correction.

Figure 14:
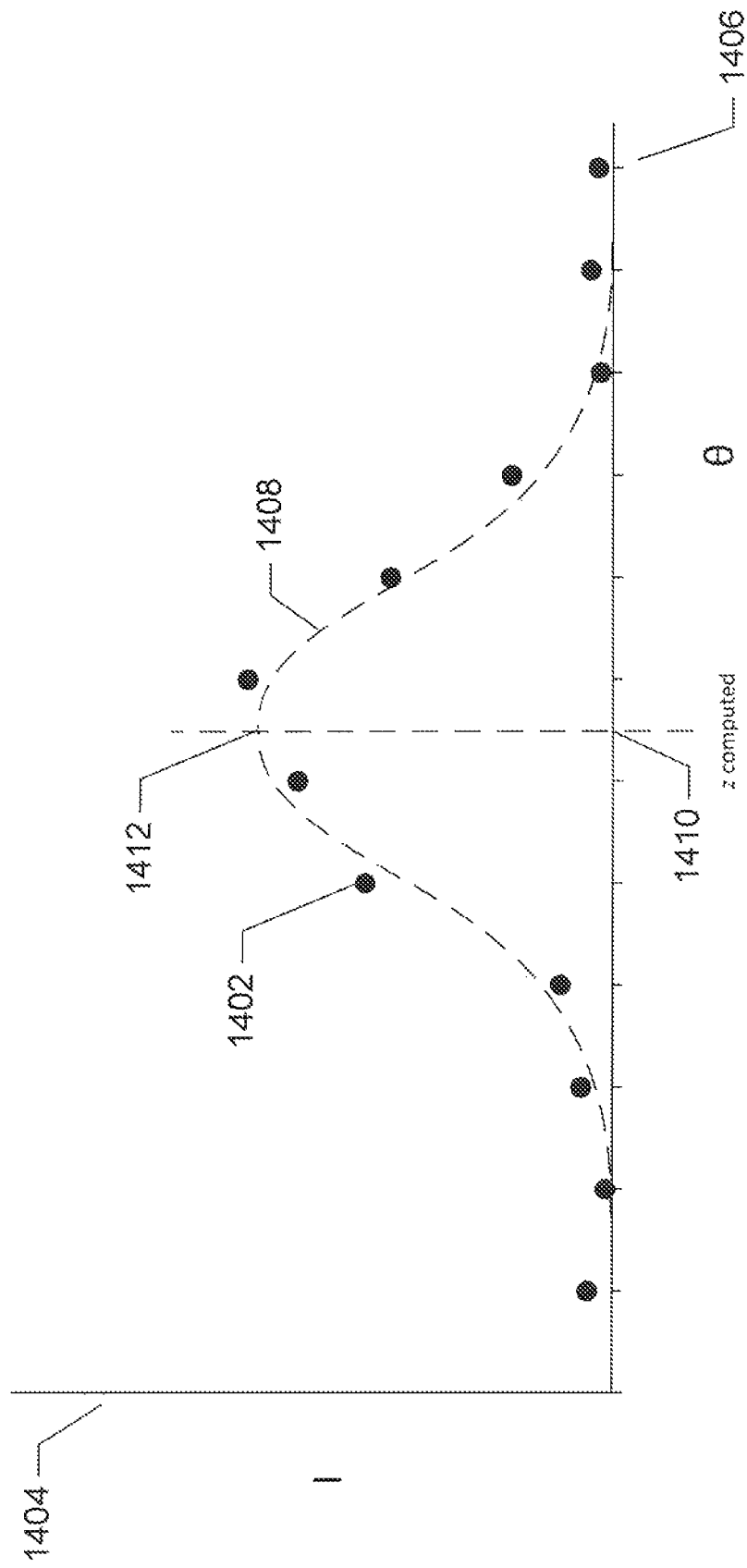
FIG. 14 illustrates computation of the current z position of an optical instrument, according to one embodiment of the present invention, from accumulated sums of intensity values.

FIG. 14 illustrates computation of the current z position of an optical instrument, according to one embodiment of the present invention, from accumulated sums of intensity values. FIG. 14 illustrates computation of the current z position, which is placed in register 1308 in the embodiment of the present invention discussed with reference to FIG. 13G. In FIG. 14, the intensity values at each cylindrical-shall position are represented by filled circles, such as filled circle 1402. The intensity values are plotted with respect to vertical axis 1404 and cylindrical-shaft positions are plotted with respect to the horizontal axis 1406. The plotted filled disks correspond to the contents of the column of registers 1304 following the parallel summations, as discussed with reference to FIG. 13G. While it would be convenient for the intensity peak to always fall at a rotor position corresponding to a particular cylindrical shaft, and while it would be convenient for the measured intensities to be error free, this is generally not the case. Therefore, an autofocus-processing component of an autofocusing module that represents one embodiment of the present invention may employ one of many different curve-fitting algorithms to fit an idealized intensity curve 1408 to the plotted points. An estimated position can then be computed as the position 1410 corresponding to the peak intensity 1412 of the computed curve 1408. The computed z position, as shown in FIG. 14, may tall between the z positions corresponding to the rotational angles at which light intensity is measured by the autofocus module that represents one embodiment of the present invention. Thus, the number of shafts in a rotor may be less than, equal to, or greater than the number of positions that the electromechanical stage can be driven within the range of z positions scanned by the autofocus module.

Although determining the distance from the objective lens to the cover-slip interface by analyzing the intensity of back-reflected autofocus light, as discussed above with reference to graph 324 in FIG. 3, provides one basis for analysis of data, collected by the autofocus photodetector, by the autofocus processing component (1212 in FIG. 12), other approaches are possible. In one alternative approach that represents an alternate embodiment of the present invention, rather than determining the z position at which the intensity of backscattered light is highest, the autofocus system undertakes a calibration operation, at a z position selected by the user of an optical system or by automated program control of the optical system, in which a z-position scan is carried out slightly above and slightly below the selected z position. The purpose of the scan is to identify, in the Gaussian-like intensity curve for the backscattered light from the cover-slip interface, those z positions, and corresponding autofocus-rotor positions, corresponding to the steep sides of the Gaussian-like curve. It is in this portion of the Gaussian curve that measured changes in backscattered-autofocus-light intensity are most sensitively dependent on changes in z position of the objective lens with respect to the cover-slip interface. Then, during a data-collection phase following calibration, the changes in intensity measured from the identified autofocus-rotor positions are continuously monitored, and the z position is controlled to maintain the calibration-step intensities at those identified autofocus-rotor positions. Thus, in this alternative approach to analysis of autofocus-photodetector-acquired data, the z position of the optical instrument is controlled not as a relative offset to a z position at which backscattered autofocus light is maximally intense, but instead is controlled to maintain a calibration-step-determined intensity for backscattered light measured at those autofocus-rotor positions which are most sensitive to z-position change. In yet additional embodiments of the present invention, more complex curve-fitting algorithms may be used to precisely fit measured backscattered auto-focus light intensities to an empirically-determined or theoretical backscattered-auto-focus-light-vs.-z-position curve in order to maintain the optical-instrument z position at a desired value.

In another embodiment of the present invention, an additional optical component is introduced into the autofocus system between the infrared autofocus source 302 and the beam splitter 308, or an optical component already within the optical path is tuned or modified, in order to produce a slightly converging or slightly diverging autofocus-light beam, rather than a beam of parallel light rays. By inputting a slightly converging or diverging beam into the optical system, the autofocus light does not end up focused to a point, within the sample. When the autofocus light is precisely focused within the sample, the high intensity of autofocus light may deleterious effect the sample and optical-data collection. For example, when infrared autofocus light is used, highly focused autofocus light may lead to high temperatures within the sample and damage to living cells or temperature-induced changes in the chemical composition of the sample.

Figure 15:
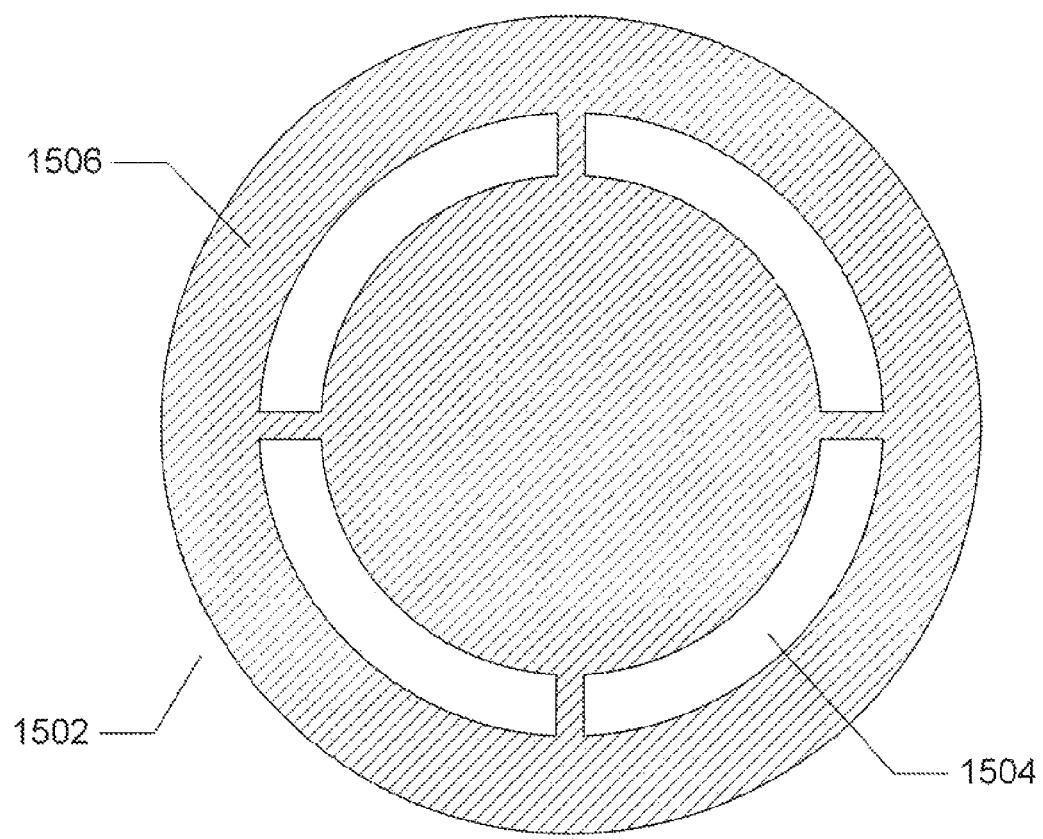
FIG. 15 illustrates a typical ring aperture.

In another embodiment of the present invention, a ring aperture is placed between the infrared autofocus source 302 and the beam splitter 308 in order to transmit through the ring aperture only those rays that would be focused at a steep angle by the objective lens toward the cover-slip interface. The percentage of back reflected light is greatest for such steeply angled rays and thus it is possible to reduce the overall amount of incident light on the sample while still maintaining the necessary back-reflected autofocus-light intensity by employing the ring aperture to filter out less steeply angled rays that contribute little to the intensity of the back-reflected. FIG. 15 illustrates a typical ring aperture. The ring aperture 1502 includes a transparent or empty ring 1505 within an otherwise opaque or translucent disk 1506. Any of various different types of ring apertures can be employed in various embodiments of the present invention.

Although the present invention has been described in terms of particular embodiments, it is not intended that the invention be limited to these embodiments. Modifications will be apparent to those skilled in the art. For example, as discussed above, any of a variety of different types of mechanical rotors can be used to effect a z-position scan, in the optical-axis direction, in order to locate the peak intensity of a backscattered autofocus-light from a cover-slip interface in order to determine the current position of the objective lens with respect to the cover slip. A variety of different types of autofocus-processing subcomponents can be implemented from logic circuitry or a software-controlled microprocessor in order to continuously compute z position from intensity data collected from the photodetector of the autofocus system by varying any of many design and implementation parameters, including programming language, modular organization, control structures, data structures, and other parameters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An autofocus subsystem comprising: an autofocus light source; optical components that direct light from the autofocus light source into the optical path of an optical instrument: a focusing lens that focuses autofocus light returned to the autofocus system from the optical path of the optical instrument onto a photodetector; and an autofocus rotor interposed between the focusing lens and photodetector that implements an optical-axis scan to determine the focal point of the focusing lens for autofocus light back-reflected from a surface in the optical path of the optical instrument, wherein the autofocus rotor includes: a cylindrical rotor that is rotated about a central axis: a number of hollow, circularly disposed, cylindrical shafts that span the rotor in the direction of the central axis; and an opaque disk with a central pinhole mounted within each cylindrical shaft at a particular distance from the top of the rotor corresponding to an autofocus-subsystem optical-axis position $z_d$ from the focusing lens.

2. The autofocus subsystem of claim 1 wherein, as the autofocus rotor is rotated, each cylindrical shaft moves, in turn, into and out of the autofocus-subsystem optical path between the focusing lens and the photodetector, so that autofocus light passing through the central pinhole falls onto the photodetector when the central pinhole is aligned with the autofocus-subsystem optical axis.

3. The autofocus subsystem of claim 2 wherein light intensity is recorded by the autofocus subsystem when each pinhole within each cylindrical shall is aligned with the autofocus-subsystem optical axis.

4. The autofocus subsystem of claim 3 wherein each recorded light intensity is mapped, by the autofocus subsystem, to the $z_d$ of the pinhole within the cylindrical shaft through which, when aligned with the autofocus-subsystem optical axis, the autofocus light passed to fall onto the photodetector and generate the recorded intensity.

5. The autofocus subsystem of claim 1 wherein, as the autofocus rotor rotates, a scan of the autofocus-subsystem optical axis is effected, with the intensities of light passing through the rotor and falling onto the photodetector at various rotational positions recorded along with indications of the $Z_d$ positions corresponding to the rotational positions.

6. The autofocus subsystem of claim 5 further including a computational subsystem that computes, from the recorded intensities and $z_d$ positions, a $z_d$ position corresponding to a maximum intensity.

7. The autofocus subsystem of claim 6 wherein the computational subsystem computes, from the $z_d$ position corresponding to a maximum intensity, a corresponding distance, along the optical axis of the optical instrument, from an object lens of the optical instrument to a point on the optical path at which autofocus light is back-reflected.

8. The autofocus subsystem of claim 7 wherein the computational subsystem computes successive values for the corresponding distance, along the optical axis of the optical instrument, from the object lens of the optical instrument to the point on the optical path at which autofocus light is back-reflected, at the frequency that the autofocus rotor is rotated.

9. The autofocus subsystem of claim 6 wherein the autofocus subsystem additionally computes an optical-axis correction $\Delta z$ from the computed corresponding distance, along the optical axis of the optical instrument, from the object lens of the optical instrument to the point on the optical path at which autofocus light is back-reflected and a desired distance, along the optical axis of the optical instrument, from the object lens of the optical instrument to the point on the optical path at which autofocus light is back-reflected, and transmits the optical-axis correction $\Delta z$ to an electromechanical component of the optical instrument to maintain the distance, along the optical axis of the optical instrument, from the object lens of the optical instrument to the point on the optical path at which autofocus light is back-reflected at the desired distance.

10. The autofocus subsystem of claim 1 further including an index detector that detects a physical index on the autofocus rotor when the physical index is rotated to a position proximal to the index detector.

11. The autofocus subsystem of claim 1 wherein the light source is a laser.

12. The autofocus subsystem of claim 11 wherein the autofocus system includes an additional focusing element that focuses light from the light source to a slightly converging autofocus beam to prevent the light from the light source being focused to a sharp point within a sample by the optical components of the optical instrument.

13. The autofocus subsystem of claim 11 wherein the autofocus system includes an additional focusing element that focuses light from the light source to a slightly diverging autofocus beam to prevent the light from the light source being focused to a sharp point within a sample by the optical components of the optical instrument.

14. The autofocus subsystem of claim 11 wherein light emitted by the light source passes through a ring aperture.

15. An autofocus subsystem comprising: an autofocus light source; optical components that direct light from the autofocus light source into the optical path of an optical instrument: a focusing lens that focuses autofocus light returned to the autofocus system from the optical path of the optical instrument onto a photodetector; and an autofocus rotor interposed between the focusing lens and photodetector that implements an optical-axis scan to determine the focal point of the focusing lens for autofocus light back-reflected from a surface in the optical path of the optical instrument, wherein the autofocus rotor includes: a cylindrical rotor that is rotated about a central axis: a number of hollow, circularly disposed, cylindrical shafts that span the rotor in the direction of the central axis; and a cylindrical transparent rod, or focus-extension window, mounted within each cylindrical shaft, each cylindrical transparent rod, or focus-extension window, having a particular thickness and/or particular refractive index.

16. The autofocus subsystem of claim 15, wherein a single fixed pinhole aperture is mounted between the rotor and the photodetector.

17. The autofocus subsystem of claim 16 wherein, as the autofocus rotor is rotated, each cylindrical shaft moves, in turn, into and out of the autofocus-subsystem optical path between the focusing lens and the photodetector, so that autofocus light passing through a cylindrical shaft currently within the optical path focuses to a z position with respect to the pinhole aperture determined by the optical characteristics of the focusing lens and the focus-extension characteristics of the focus-extension window mounted within the cylindrical shaft.

18. The autofocus subsystem of claim 17 wherein light intensity is recorded by the autofocus subsystem when each window within each cylindrical shaft is aligned with the autofocus-subsystem optical axis.

19. The autofocus subsystem of claim 18 wherein each recorded light intensity is mapped, by the autofocus subsystem, to the focus-extension characteristics of the focus-extension window within the cylindrical shaft through which, when aligned with the autofocus-subsystem optical axis, the autofocus light passed to fall onto the photodetector and generate the recorded intensity.

20. The autofocus subsystem of claim 15 wherein, as the autofocus rotor rotates, a scan of the autofocus-subsystem optical axis is effected, with the intensities of light passing through the rotor and falling onto the photodetector at various rotational positions recorded along with indications of the $Z_d$ positions corresponding to the rotational positions.

21. The autofocus subsystem of claim 20 further including a computational subsystem that computes, from the recorded intensities and $z_d$ positions, a $z_d$ position corresponding to a maximum intensity.

22. The autofocus subsystem of claim 21 wherein the computational subsystem computes, from the $z_d$ position corresponding to a maximum intensity, a corresponding distance, along the optical axis of the optical instrument, from an object lens of the optical instrument to a point on the optical path at which autofocus light is back-reflected.

23. The autofocus subsystem of claim 22 wherein the computational subsystem computes successive values for the corresponding distance, along the optical axis of the optical instrument, from the object lens of the optical instrument to the point on the optical path at which autofocus light is back-reflected, at the frequency that the autofocus rotor is rotated.

24. The autofocus subsystem of claim 21 wherein the autofocus subsystem additionally computes an optical-axis correction $\Delta z$ from the computed corresponding distance, along the optical axis of the optical instrument, from the object lens of the optical instrument to the point on the optical path at which autofocus light is back-reflected and a desired distance, along the optical axis of the optical instrument, from the object lens of the optical instrument to the point on the optical path at which autofocus light is back-reflected, and transmits the optical-axis correction Δz to an electromechanical component of the optical instrument to maintain the distance, along the optical axis of the optical instrument, from the object lens of the optical instrument to the point on the optical path at which autofocus light is back-reflected at the desired distance.

25. The autofocus subsystem of claim 15 further including an index detector that detects a physical index on the autofocus rotor when the physical index is rotated to a position proximal to the index detector.

26. The autofocus subsystem of claim 15 wherein the light source is a laser.

27. The autofocus subsystem of claim 26 wherein the autofocus system includes an additional focusing element that focuses light from the light source to a slightly converging autofocus beam to prevent the light from the light source being focused to a sharp point within a sample by the optical components of the optical instrument.

28. The autofocus subsystem of claim 26 wherein the autofocus system includes an additional focusing element that focuses light from the light source to a slightly diverging autofocus beam to prevent the light from the light source being focused to a sharp point within a sample by the optical components of the optical instrument.

29. The autofocus subsystem of claim 26 wherein light emitted by the light source passes through a ring aperture.

30. An autofocus subsystem comprising: an autofocus light source; optical components that direct light from the autofocus light source into the optical path of an optical instrument: a focusing lens that focuses autofocus light returned to the autofocus system from the optical path of the optical instrument onto a photodetector; and an autofocus rotor interposed between the focusing lens and photodetector that implements an optical-axis scan to determine the focal point of the focusing lens for autofocus light back-reflected from a surface in the optical path of the optical instrument, wherein the auto focus rotor includes: a cylindrical rotor that is rotated about a central axis; a hollow, helical shaft or shafts that span the rotor in the direction of the central axis; and a helical slit within the helical shaft or shafts, the particular distance from the top of the rotor to helical slit varying continuously over a range of $z_d$ positions with angular displacement from a reference point on or near a circumference of the rotor.

31. The autofocus subsystem of claim 30 wherein, as the autofocus rotor is rotated, autofocus light passing through the helical slit or slits falls onto the photodetector, having passed through the helical slit at a $z_d$ position related to the angular displacement of the rotor with respect to a rotational reference point.

32. The autofocus subsystem of claim 31 wherein each recorded light intensity is mapped, by the autofocus subsystem, to the $z_d$ position of the helical slit or slits within the helical shaft or shafts through which the autofocus light passed to fall onto the photodetector and generate the recorded intensity.

33. The autofocus subsystem of claim 30 wherein, as the autofocus rotor rotates, a scan of the autofocus-subsystem optical axis is effected, with the intensities of light passing through the rotor and falling onto the photodetector at various rotational positions recorded along with indications of the $Z_d$ positions corresponding to the rotational positions.

34. The autofocus subsystem of claim 33 further including a computational subsystem that computes, from the recorded intensities and $z_d$ positions, a $z_d$ position corresponding to a maximum intensity.

35. The autofocus subsystem of claim 34 wherein the computational subsystem computes, from the $z_d$ position corresponding to a maximum intensity, a corresponding distance, along the optical axis of the optical instrument, from an object lens of the optical instrument to a point on the optical path at which autofocus light is back-reflected.

36. The autofocus subsystem of claim 35 wherein the computational subsystem computes successive values for the corresponding distance, along the optical axis of the optical instrument, from the object lens of the optical instrument to the point on the optical path at which autofocus light is back-reflected, at the frequency that the autofocus rotor is rotated.

37. The autofocus subsystem of claim 34 wherein the autofocus subsystem additionally computes an optical-axis correction Δz from the computed corresponding distance, along the optical axis of the optical instrument, from the object lens of the optical instrument to the point on the optical path at which autofocus light is back-reflected and a desired distance, along the optical axis of the optical instrument, from the object lens of the optical instrument to the point on the optical path at which autofocus light is back-reflected, and transmits the optical-axis correction Δz to an electromechanical component of the optical instrument to maintain the distance, along the optical axis of the optical instrument, from the object lens of the optical instrument to the point on the optical path at which autofocus light is back-reflected at the desired distance.

38. The autofocus subsystem of claim 30 further including an index detector that detects a physical index on the autofocus rotor when the physical index is rotated to a position proximal to the index detector.

39. The autofocus subsystem of claim 30 wherein the light source is a laser.

40. The autofocus subsystem of claim 39 wherein the autofocus system includes an additional focusing element that focuses light from the light source to a slightly converging autofocus beam to prevent the light from the light source being focused to a sharp point within a sample by the optical components of the optical instrument.

41. The autofocus subsystem of claim 39 wherein the autofocus system includes an additional focusing element that focuses light from the light source to a slightly diverging autofocus beam to prevent the light from the light source being focused to a sharp point within a sample by the optical components of the optical instrument.

42. The autofocus subsystem of claim 39 wherein light emitted by the light source passes through a ring aperture.

* * * * *